United States Patent
Jones-McFadden et al.

(10) Patent No.: US 10,387,845 B2
(45) Date of Patent: Aug. 20, 2019

(54) SYSTEM FOR FACILITATING APPOINTMENT CALENDARING BASED ON PERCEIVED CUSTOMER REQUIREMENTS

(71) Applicant: BANK OF AMERICA CORPORATION, Charlotte, NC (US)

(72) Inventors: Alicia C. Jones-McFadden, Fort Mill, SC (US); Matthew Hsieh, Charlotte, NC (US); Jade Michelle Le Vo-Dinh, Charlotte, NC (US); David M. Grigg, Rock Hill, SC (US); Carrie Anne Hanson, Charlotte, NC (US); Peter John Bertanzetti, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 657 days.

(21) Appl. No.: 14/797,001

(22) Filed: Jul. 10, 2015

(65) Prior Publication Data
US 2017/0011350 A1  Jan. 12, 2017

(51) Int. Cl.
*G06Q 10/10* (2012.01)
*H04L 29/08* (2006.01)

(52) U.S. Cl.
CPC ..... *G06Q 10/1095* (2013.01); *G06Q 10/1093* (2013.01); *H04L 67/10* (2013.01); *H04L 67/306* (2013.01)

(58) Field of Classification Search
CPC ......... G06Q 10/1095; G06Q 10/06311; G06Q 10/047; G06Q 10/06314; G06Q 10/063116; G06Q 10/06316; G06Q 10/1093; H04M 1/72566; Y10S 707/951; Y10S 715/963; H04L 67/10; H04L 67/306
See application file for complete search history.

(56) References Cited

U.S. PATENT DOCUMENTS

| | | | |
|---|---|---|---|
| 5,289,531 A | * | 2/1994 | Levine .............. G04G 11/00 379/93.23 |
| 5,732,080 A | | 3/1998 | Ferguson et al. |
| 5,799,287 A | | 8/1998 | Dembo |
| 5,842,009 A | | 11/1998 | Borovoy et al. |
| 5,848,395 A | | 12/1998 | Edgar et al. |
| 5,855,006 A | | 12/1998 | Huemoeller et al. |

(Continued)

OTHER PUBLICATIONS

Search notes, Google Patents, Mar. 28, 2019.*

(Continued)

*Primary Examiner* — Tyler W Knox
(74) *Attorney, Agent, or Firm* — Michael A. Springs; Moore & Van Allen PLLC; Nicholas C. Russell

(57) ABSTRACT

Embodiments of the invention include systems, methods, and computer-program products for scheduling and affecting appointment calendaring based on perceived user requirements. As such, the invention provides for a smart appointment calendaring based on the automatic and real time analysis of a user's financial information, transaction history, navigation history and the like. The system then identifies one or more relevant specialists and schedules one or more appointments. Based on needs identified from analysis of user information, the invention may create an appointment package for the user. Thus, the system may schedule appointments with one or more specialists based on the user's requirements.

11 Claims, 9 Drawing Sheets

(56) References Cited

U.S. PATENT DOCUMENTS

| | | | |
|---|---|---|---|
| 5,948,040 A * | 9/1999 | DeLorme | G01C 21/36 340/990 |
| 6,021,397 A | 2/2000 | Jones et al. | |
| 6,038,548 A | 3/2000 | Kamil | |
| 6,078,888 A | 6/2000 | Johnson, Jr. | |
| 6,389,454 B1 | 5/2002 | Ralston et al. | |
| 6,732,080 B1 * | 5/2004 | Blants | G06Q 10/109 705/7.18 |
| 6,948,135 B1 * | 9/2005 | Ruthfield | G06F 3/0481 715/854 |
| 6,959,873 B2 | 11/2005 | Kayanakis et al. | |
| 6,996,539 B1 | 2/2006 | Wallman | |
| 7,177,830 B2 | 2/2007 | Shields et al. | |
| 7,188,073 B1 | 3/2007 | Tam et al. | |
| 7,398,234 B1 | 7/2008 | Theis et al. | |
| 7,401,040 B2 * | 7/2008 | Sloan | G06Q 40/00 705/35 |
| 7,490,050 B2 | 2/2009 | Grover et al. | |
| 7,519,551 B2 | 4/2009 | Bent et al. | |
| 7,580,862 B1 * | 8/2009 | Montelo | G06Q 10/10 705/26.1 |
| 7,580,884 B2 | 8/2009 | Cook | |
| 7,584,253 B2 * | 9/2009 | Curbow | G06Q 10/107 709/206 |
| 7,606,661 B2 | 10/2009 | Kwak | |
| 7,612,879 B2 | 11/2009 | Stumpe et al. | |
| 7,665,658 B2 | 2/2010 | Fields | |
| 7,679,636 B1 | 3/2010 | Beck et al. | |
| 7,720,732 B2 | 5/2010 | Lortscher, Jr. | |
| 7,783,545 B2 | 8/2010 | Sloan et al. | |
| 7,847,686 B1 | 12/2010 | Atkins et al. | |
| 7,865,386 B2 | 1/2011 | Sarkar | |
| 7,869,583 B2 | 1/2011 | Mandalia et al. | |
| 7,869,941 B2 | 1/2011 | Coughlin et al. | |
| 7,933,821 B1 | 4/2011 | Bent et al. | |
| 7,941,753 B2 | 5/2011 | Meisels et al. | |
| 7,954,698 B1 * | 6/2011 | Pliha | G06Q 40/02 235/379 |
| 7,983,910 B2 * | 7/2011 | Subramanian | G10L 19/0018 704/250 |
| 7,990,266 B2 | 8/2011 | Burnham et al. | |
| 8,015,049 B1 | 9/2011 | Tam et al. | |
| 8,095,113 B2 | 1/2012 | Kean et al. | |
| 8,150,718 B2 | 4/2012 | Olliphant | |
| 8,161,561 B1 | 4/2012 | Sobel et al. | |
| 8,170,932 B1 | 5/2012 | Krakowiecki et al. | |
| 8,175,908 B1 | 5/2012 | Anderson | |
| 8,185,426 B1 | 5/2012 | Khoubyari | |
| 8,234,194 B2 | 7/2012 | Mele et al. | |
| 8,239,310 B2 | 8/2012 | Lortscher, Jr. | |
| 8,244,566 B1 | 8/2012 | Coley et al. | |
| 8,249,965 B2 | 8/2012 | Tumminaro | |
| 8,254,962 B2 * | 8/2012 | Carro | H04M 1/72566 455/418 |
| 8,306,885 B2 | 11/2012 | Brose et al. | |
| 8,311,916 B1 | 11/2012 | Bent et al. | |
| 8,321,285 B1 | 11/2012 | Hurst | |
| 8,346,661 B2 | 1/2013 | Allison, Jr. et al. | |
| 8,364,400 B2 | 1/2013 | Coughlin et al. | |
| 8,364,550 B2 | 1/2013 | Van Rensburg | |
| 8,417,608 B2 | 4/2013 | Benefield et al. | |
| 8,438,066 B1 | 5/2013 | Yuen et al. | |
| 8,442,906 B1 * | 5/2013 | Thomas | G06Q 40/02 705/38 |
| 8,457,740 B2 | 6/2013 | Osche | |
| 8,457,887 B2 | 6/2013 | Gupta et al. | |
| 8,457,888 B2 | 6/2013 | Ranford | |
| 8,459,560 B1 | 6/2013 | Mineo-Goggin | |
| 8,489,329 B2 | 7/2013 | Coughlin et al. | |
| 8,521,637 B2 | 8/2013 | Brandes et al. | |
| 8,548,908 B2 | 10/2013 | Friedman | |
| 8,577,803 B2 | 11/2013 | Chatterjee et al. | |
| 8,577,804 B1 | 11/2013 | Bacastow | |
| 8,600,870 B2 | 12/2013 | Milana | |
| 8,612,324 B1 | 12/2013 | Bent et al. | |
| 8,615,468 B2 | 12/2013 | Varadarajan | |
| 8,639,621 B1 | 1/2014 | Ellis et al. | |
| 8,671,009 B1 | 3/2014 | Coley et al. | |
| 8,682,385 B2 | 3/2014 | Kumar et al. | |
| 8,688,557 B2 | 4/2014 | Rose et al. | |
| 8,700,503 B2 | 4/2014 | Krakowiecki et al. | |
| 8,700,729 B2 | 4/2014 | Dua | |
| 8,706,590 B2 | 4/2014 | Benefield et al. | |
| 8,706,628 B2 | 4/2014 | Phillips | |
| 8,707,206 B1 | 4/2014 | Boutcher et al. | |
| 8,725,590 B2 | 5/2014 | Lipscher et al. | |
| 8,751,379 B1 | 6/2014 | Bueche, Jr. | |
| 8,763,896 B2 | 7/2014 | Kushevsky et al. | |
| 8,849,689 B1 | 9/2014 | Jagannathan et al. | |
| 8,902,279 B2 | 12/2014 | Calman et al. | |
| 8,924,292 B1 | 12/2014 | Ellis et al. | |
| 8,930,236 B2 | 1/2015 | Gillenson et al. | |
| 8,930,273 B2 | 1/2015 | Varadarajan | |
| 8,930,294 B2 | 1/2015 | Anandaraj | |
| 8,996,417 B1 | 3/2015 | Channakeshava | |
| 9,014,662 B1 | 4/2015 | Gailloux et al. | |
| 9,026,461 B2 | 5/2015 | Calman et al. | |
| 9,374,370 B1 | 6/2016 | Bent, II et al. | |
| 9,491,294 B2 * | 11/2016 | Kaiser | G06Q 10/109 |
| 9,496,736 B1 * | 11/2016 | Johansson | H02J 7/0054 |
| 9,846,906 B1 * | 12/2017 | Acharya | G06Q 40/00 |
| 9,875,471 B1 * | 1/2018 | Myrick | G06Q 10/109 |
| 2001/0007983 A1 | 7/2001 | Lee | |
| 2001/0042785 A1 | 11/2001 | Walker et al. | |
| 2002/0194002 A1 * | 12/2002 | Petrushin | G10L 17/26 704/270 |
| 2003/0200172 A1 | 10/2003 | Randle et al. | |
| 2003/0229595 A1 | 12/2003 | Mononen et al. | |
| 2004/0117302 A1 | 6/2004 | Weichert et al. | |
| 2004/0139013 A1 | 7/2004 | Barbier et al. | |
| 2004/0153368 A1 * | 8/2004 | Freishtat | G06Q 30/06 705/26.41 |
| 2004/0225565 A1 | 11/2004 | Selman | |
| 2005/0043997 A1 | 2/2005 | Sahota et al. | |
| 2005/0177503 A1 | 8/2005 | Thomas | |
| 2005/0182743 A1 * | 8/2005 | Koenig | G06Q 30/02 |
| 2005/0222890 A1 | 10/2005 | Cheng et al. | |
| 2005/0267800 A1 | 12/2005 | Tietzen et al. | |
| 2006/0265089 A1 * | 11/2006 | Conway | G10L 15/22 700/94 |
| 2007/0015495 A1 * | 1/2007 | Winter | G08G 1/205 455/414.1 |
| 2007/0055561 A1 * | 3/2007 | Perrella | G06Q 10/063116 705/7.19 |
| 2007/0061421 A1 * | 3/2007 | Karidi | H04L 67/22 709/218 |
| 2007/0106725 A1 * | 5/2007 | Starr | G06Q 10/109 709/204 |
| 2007/0220123 A1 * | 9/2007 | Agrawal | G06Q 10/063112 709/223 |
| 2007/0226034 A1 * | 9/2007 | Khan | G06Q 10/109 705/7.19 |
| 2007/0255620 A1 | 11/2007 | Tumminaro et al. | |
| 2007/0255682 A1 | 11/2007 | Brelsford et al. | |
| 2008/0004926 A1 * | 1/2008 | Horvitz | G06Q 10/047 705/7.26 |
| 2008/0034221 A1 | 2/2008 | Hammad et al. | |
| 2008/0052162 A1 * | 2/2008 | Wood | G06Q 10/109 705/14.61 |
| 2008/0059265 A1 | 3/2008 | Biazetti et al. | |
| 2008/0065726 A1 * | 3/2008 | Schoenberg | G06Q 10/06375 709/205 |
| 2008/0086455 A1 * | 4/2008 | Meisels | G01C 21/26 |
| 2008/0110983 A1 | 5/2008 | Ashfield | |
| 2008/0120158 A1 | 5/2008 | Xiao et al. | |
| 2008/0177826 A1 | 7/2008 | Pitroda | |
| 2008/0203151 A1 | 8/2008 | Dixon et al. | |
| 2008/0208741 A1 | 8/2008 | Arthur et al. | |
| 2008/0208743 A1 | 8/2008 | Arthur et al. | |
| 2008/0208762 A1 | 8/2008 | Arthur et al. | |
| 2008/0223937 A1 | 9/2008 | Preta et al. | |
| 2008/0309617 A1 | 12/2008 | Kong et al. | |

(56) References Cited

U.S. PATENT DOCUMENTS

| | | |
|---|---|---|
| 2009/0036148 A1* | 2/2009 | Yach .................... G06Q 10/109 455/457 |
| 2009/0094088 A1* | 4/2009 | Chen ................ G06Q 10/06312 705/7.19 |
| 2009/0098854 A1 | 4/2009 | Park et al. |
| 2009/0104888 A1 | 4/2009 | Cox |
| 2009/0113312 A1* | 4/2009 | Schoenberg ........... G06Q 10/10 715/753 |
| 2009/0125386 A1 | 5/2009 | Willison et al. |
| 2009/0138317 A1* | 5/2009 | Schoenberg ........... G06Q 40/00 705/2 |
| 2009/0144136 A1 | 6/2009 | Cohagan et al. |
| 2009/0165022 A1* | 6/2009 | Madsen ............... G06Q 10/109 719/318 |
| 2009/0182676 A1 | 7/2009 | Barbier et al. |
| 2009/0200371 A1 | 8/2009 | Kean et al. |
| 2009/0254971 A1* | 10/2009 | Herz ..................... G06Q 10/10 726/1 |
| 2009/0287562 A1 | 11/2009 | Bosch et al. |
| 2010/0030578 A1* | 2/2010 | Siddique ............ G06Q 10/0637 705/3 |
| 2010/0057513 A1 | 3/2010 | Carlson |
| 2010/0069035 A1* | 3/2010 | Johnson .................. H04W 4/02 455/404.1 |
| 2010/0106578 A1 | 4/2010 | Allio et al. |
| 2010/0125495 A1 | 5/2010 | Smith et al. |
| 2010/0125510 A1 | 5/2010 | Smith et al. |
| 2010/0174998 A1* | 7/2010 | Lazarus ............... G06Q 10/109 715/751 |
| 2010/0191658 A1* | 7/2010 | Kannan ................. G06F 17/279 705/304 |
| 2010/0245361 A1* | 9/2010 | Ofek .................. G06Q 30/0241 345/441 |
| 2010/0276484 A1 | 11/2010 | Banerjee et al. |
| 2010/0293021 A1 | 11/2010 | Van Styn et al. |
| 2010/0293029 A1* | 11/2010 | Olliphant ......... G06Q 10/06314 705/7.19 |
| 2011/0010220 A1* | 1/2011 | Burnham ............. G06Q 10/109 705/7.19 |
| 2011/0077860 A1* | 3/2011 | Coughlin ............... G01C 21/20 701/465 |
| 2011/0125610 A1 | 5/2011 | Goodsall et al. |
| 2011/0178910 A1 | 7/2011 | Benefield et al. |
| 2011/0188351 A1* | 8/2011 | Aaron .................. G06Q 10/109 368/10 |
| 2011/0212711 A1* | 9/2011 | Scott .................... G06Q 10/109 455/414.2 |
| 2011/0250866 A1 | 10/2011 | Fisher |
| 2011/0261947 A1 | 10/2011 | Benefield et al. |
| 2011/0276493 A1 | 11/2011 | Graham, III et al. |
| 2011/0289106 A1* | 11/2011 | Rankin, Jr. ............ G06Q 10/10 707/769 |
| 2011/0320345 A1 | 12/2011 | Taveau et al. |
| 2012/0023026 A1 | 1/2012 | Chen et al. |
| 2012/0054095 A1* | 3/2012 | Lesandro ............... G06Q 20/10 705/39 |
| 2012/0116861 A1 | 5/2012 | Dobyns |
| 2012/0170728 A1 | 7/2012 | Wengrovitz et al. |
| 2012/0191501 A1* | 7/2012 | Olliphant ......... G06Q 10/06314 705/7.19 |
| 2012/0216260 A1 | 8/2012 | Crawford et al. |
| 2012/0232946 A1* | 9/2012 | Cocanougher ....... G06Q 10/109 705/7.19 |
| 2012/0284188 A1 | 11/2012 | Vasquez et al. |
| 2013/0036073 A1* | 2/2013 | Kiger ..................... G06Q 40/06 705/36 R |
| 2013/0046690 A1 | 2/2013 | Calman et al. |
| 2013/0066546 A1 | 3/2013 | Meisels et al. |
| 2013/0079037 A1 | 3/2013 | Dobyns |
| 2013/0095459 A1* | 4/2013 | Tran ..................... A61B 5/6816 434/247 |
| 2013/0110719 A1 | 5/2013 | Carter et al. |
| 2013/0124641 A1* | 5/2013 | Ryabchun ........... G06F 11/3495 709/206 |
| 2013/0151400 A1 | 6/2013 | Makhotin et al. |
| 2013/0159180 A1 | 6/2013 | Jhunjhunwala et al. |
| 2013/0173393 A1* | 7/2013 | Calman ............. G06Q 30/0207 705/14.66 |
| 2013/0179353 A1 | 7/2013 | Ran et al. |
| 2013/0191232 A1 | 7/2013 | Calman et al. |
| 2013/0226682 A1 | 8/2013 | Grossman |
| 2013/0226686 A1 | 8/2013 | Grossman |
| 2013/0268337 A1 | 10/2013 | Morello |
| 2013/0304651 A1 | 11/2013 | Smith |
| 2013/0332219 A1* | 12/2013 | Clark ..................... G06Q 30/02 705/7.19 |
| 2013/0346302 A1 | 12/2013 | Purves et al. |
| 2014/0006276 A1 | 1/2014 | Grigg et al. |
| 2014/0012743 A1 | 1/2014 | Hanson et al. |
| 2014/0035949 A1* | 2/2014 | Singh .................... G06Q 10/109 345/629 |
| 2014/0046715 A1* | 2/2014 | Lau ..................... G06Q 10/1095 705/7.19 |
| 2014/0074591 A1* | 3/2014 | Allen .................. G06Q 30/0244 705/14.43 |
| 2014/0104370 A1* | 4/2014 | Calman .................. G06Q 30/00 348/14.08 |
| 2014/0106721 A1 | 4/2014 | Calman et al. |
| 2014/0108557 A1 | 4/2014 | Calman et al. |
| 2014/0136259 A1 | 5/2014 | Kinsey, II et al. |
| 2014/0136264 A1 | 5/2014 | Kinsey, II |
| 2014/0136265 A1 | 5/2014 | Kinsey, II |
| 2014/0136266 A1 | 5/2014 | Kinsey, II et al. |
| 2014/0136373 A1 | 5/2014 | Kinsey, II et al. |
| 2014/0136443 A1 | 5/2014 | Kinsey, II et al. |
| 2014/0164043 A1 | 6/2014 | Jordan |
| 2014/0181741 A1 | 6/2014 | Apacible et al. |
| 2014/0207680 A1 | 7/2014 | Rephlo |
| 2014/0229099 A1* | 8/2014 | Garrett ............ G06Q 10/063114 701/465 |
| 2014/0244332 A1* | 8/2014 | Mermelstein ...... G06Q 10/1093 705/7.16 |
| 2014/0250006 A1 | 9/2014 | Makhotin et al. |
| 2014/0301543 A1* | 10/2014 | Anisimov ............. H04M 3/523 379/266.07 |
| 2014/0379407 A1 | 12/2014 | Horton |
| 2015/0001932 A1 | 1/2015 | Inoue et al. |
| 2015/0006221 A1* | 1/2015 | Mermelstein ...... G06Q 10/1093 705/7.19 |
| 2015/0058092 A1 | 2/2015 | Rea et al. |
| 2015/0073982 A1 | 3/2015 | Prabhu et al. |
| 2015/0088575 A1 | 3/2015 | Asli et al. |
| 2015/0100488 A1 | 4/2015 | Dua |
| 2015/0193819 A1* | 7/2015 | Chang ................ G06Q 30/0252 705/7.19 |
| 2015/0227902 A1* | 8/2015 | Bertanzetti ............. H04W 4/21 705/42 |
| 2016/0005004 A1* | 1/2016 | Trabue ............... G06Q 10/1095 705/7.19 |
| 2016/0012465 A1 | 1/2016 | Sharp |
| 2016/0063215 A1* | 3/2016 | Zamer ................ G06F 19/3481 705/3 |
| 2016/0300263 A1* | 10/2016 | Priness ............. G06Q 30/0261 |
| 2016/0358144 A1 | 12/2016 | Thrope et al. |
| 2016/0364823 A1* | 12/2016 | Cao ......................... G06Q 50/30 |
| 2017/0011349 A1* | 1/2017 | Jones-McFadden ........ G06Q 10/1095 |
| 2017/0098197 A1* | 4/2017 | Yu ...................... G06Q 10/1095 |
| 2017/0238155 A1 | 8/2017 | Dobyns |
| 2018/0032997 A1* | 2/2018 | Gordon ............. G06Q 20/3224 |

OTHER PUBLICATIONS

Search Notes, Google Scholar, Mar. 28, 2019.*
"Key Trends in Merchant Security: A Multi-Layered Approach that Will Dramatically Reduce Risk"; http://www.firstdata.com/downloads/thought-leadership/key-trends-in-merchant-security.pdf; accessed on May 30, 2013.
"Discover Brings Back Single-Use Account Numbers"; http://

(56) References Cited

OTHER PUBLICATIONS business.time.com/2011/10/19/discover-brings-back-single-use-account-numbers/; accessed on May 30, 2013.
Craig, Glen. "Using Google Calendar to Pay Bills on Time." Free From Broke. Oct. 5, 2012. http://freefrombroke.com/google-calendar-pay-bills-time/#.
Garvey, Aby. "Why It Pays to Get Organized (And How to Pay Your Bills on Time)." Simplify 101. Oct. 5, 2012. http://www.simplify101.com/pay-yourbills-on-time.php.
iBear LLC. "Bills for iPad." iTunes App Store. Oct. 5, 2012. http://itunes.apple.com/us/app/bills-for-ipad/id376152794?mt=8.
"Bills Calendar." Money Strands. Oct. 5, 2012. https://money.strands.com/features/community.
"Pageonce Money & Bills: Financial peace of mind that fits in your pocket." Pageonce Money & Bills: Free Personal Finance App for Mobile. Oct. 5, 2012. http://pageonce.com/app.
Examiner Interview Agenda, Examiner Preston, Mar. 18, 2015 for U.S. Appl. No. 13/543,649.
Quanta Services, Inc., 2007 Annual Report, 129 pages.
Revere Data Launches a New Reports Marketplace: Introducing the Revere Merger & Acquisition Scenario Reports and Revere Insight Reports, New York, Mar. 20, 2006, 4 pages (Revere1).
"Merger and Acquisition Scenario", Revere, Mar. 21, 2009, 25 pages (Revere2).
Extended European Search Report dated Jan. 29, 2010 for European Patent Application No. EP 09 25 2414.
Jerome Picault, Dimitre Kostadinov, Pablo Castells, and Alejandro Jaimes (Workshop on the Practical Use of Recommender Systems, Algorithms and Technologies (PRSAT 2010)—4th ACM Conference on Recommender Systems, Sep. 30, 2010). (Year:2010).

* cited by examiner

SYSTEM FOR FACILITATING APPOINTMENT CALENDARING BASED ON PERCEIVED CUSTOMER REQUIREMENTS

BACKGROUND

Today, areas of technology, finance, business, and the like have become highly specialized. With each specialization requiring individuals with knowledge of the unique issues that arise in that area. When a user wishes to set up an appointment with an entity, he/she generally has an issue to discuss that may require one of the specialists in that particular field. Usually, the appointment setting process takes time to identify the user issue, identify the appropriate specialist, gather or obtain the necessary information, and to schedule the appointment.

BRIEF SUMMARY

Embodiments of the present invention address the above needs and/or achieve other advantages by providing apparatuses (e.g., a system, computer program product and/or other devices) and methods for facilitating appointment calendaring based on perceived customer requirements. The invention provides for smart appointment calendaring based on analysis of a customer's transaction data, demographics, retirement plan and the like. The invention then automatically determines/predicts customer requirements and recommends specialists, products and solution to meet the requirements based on the analysis. Furthermore, in some embodiments, the invention allows the user to add a voice message to set up the appointment, thus analysis of the voice message may be performed by the invention systems to match the user with the most appropriate specialist.

In some embodiments, the invention provides and affects appointment calendaring based on perceived customer requirements. In some embodiments the invention creates a user profile comprising the user's demographic information, financial information, transaction history, navigation history and the like. In the subsequent steps the invention analyzes the user profile to determine one or more current or potential future requirements of the user. In this regard the invention may analyze the assets and liabilities, fund inflows and outflows, estimated rates of returns for the user's assets, financial history of the user and the like.

Once the invention determines the user profile and the user's current requirements or potential future requirements based on the analysis of the user profile, the invention may then determine any possible solutions to address the one or more current requirements, the one or more potential concerns for the user, and the user intent. For example the invention may determine that the user would benefit from linking accounts of the user and the user's spouse. As another example the invention may determine that the user requires a savings plan for retirement at a future date. The invention may then calculate the amount required to be saved on a monthly basis to meet goals and determine that a combination of a savings account and a certificate of deposit as a solution.

Subsequently, the invention may identify one or more specialists, advisors, or associates to help the user implement the identified solutions and/or the one or more financial products. In some embodiments the invention retrieves employee data from the financial institution database or the databases of other entities. The invention then evaluates the retrieved data to determine a primary list of suitable specialists. For instance if the user requires a new car, the invention determines a primary list of auto loan specialists and a secondary list of insurance specialists. In some embodiments the invention utilizes predetermined broad criteria to limit the number of specialists on the primary list. The broad criteria can comprise location of the specialist, working hours, availability on weekends, availability over the phone, or the like. Furthermore, one or more secondary lists along with the primary list may be generated. As such, the broad criteria can comprise conditions that a specialist on the secondary list must be located close to a specialist on the primary list but not a perfect match. The primary and secondary lists can comprise multiple sections with information associated with each of the one or more specialists comprising name, office location, practice area and the like.

Next, the invention determines the availability of the one or more specialists on the primary and secondary lists. In this regard the invention may access the calendars of the one or more specialists to determine available appointments. The invention determines the available appointments based on individual time frames in the future for each of the one or more solutions. Further, in some embodiments the invention enables the user to customize the time frames. The invention may also determine availability on the basis of required duration of an appointment. The invention then modifies and/or narrows the primary and secondary lists based on the determined availability. In some embodiments the invention transmits the identified products and solutions to the user to seek confirmation before proceeding with the subsequent steps.

Next, the user location is taken into consideration. Specifically, the invention determines current and potential future locations of the user and compares these with the locations of the one or more specialists. The invention may retrieve the home and office addresses of the user and seek specialists with office locations within a predetermined radius. In another embodiment of the invention, the invention accesses the calendar on the user device to determine potential future locations of the user.

Finally, the invention may determine one or more suitable appointments at a predetermined future date based on the determined availability and location. In some embodiments, the invention may also calendar the appointment for both the specialist and the user. In other embodiments, the invention may confirm the appointment with both the specialist and the user prior to scheduling the appointment.

In some embodiments, the invention may create an appointment package for the user. In this way, the invention may schedule appointments with one or more specialists based on the user's requirements. For example, if a user lost a debit card, the invention will identify the loss and set up appointments for a new debit card, misappropriation protection, checks, and the like.

Embodiments of the invention relate to systems, methods, and computer program products for appointment calendaring based on perceived customer requirements for a user, the invention comprising: retrieving a user profile for the user, wherein the user profile contains financial information and transaction history of the user; evaluating assets and liabilities of the user to determine asset values and liability values; determining fund in-flows and out-flows of the user associated with a predetermined time period; determining estimated rates of return for the assets that provide returns; determining financial history of the user, wherein the financial history comprises at least one of a spending history, investment history and savings history; determining one or more requirements of the user, wherein determining one or more requirements is based at least on evaluating the user profile and the determined asset and liability values, fund in-flows and out-flows and financial history, wherein the one or more requirements comprise current requirements and potential future requirements; determining the current location and one or more potential future locations of the user; identifying one or more specialists within an entity database of specialists, wherein identifying further comprises matching the one or more requirements to one or more specialists; determining availability of the one or more identified specialists and the availability of the user for appointment calendaring, wherein determining availability further comprises analyzing calendars of the one or more identified specialists and one or more calendar of the user; and scheduling, based on the availability of the one or more identified specialists and the availability of the user one or more appointments, wherein scheduling further comprises updating a calendaring application of the one or more specialists and the calendaring application of the user with the one or more appointments.

In some embodiments, the invention further comprises creating the user profile for the user by storing historic application navigation including one or more sections of an application viewed by the user based on the monitoring of the user navigation of the application in association with transaction history of the user.

In some embodiments identifying one or more specialists within an entity database of specialists that match specialization further comprises determining the location and specialization of each of the one or more identified specialists and identifying one or more primary specialists that are a perfect match to the one or more requirements, based on matching the specialization of the one or more primary specialists to the one or more requirements of the user and matching the location of the one or more primary specialists to the current location and/or one or more potential future locations of the user In some embodiments identifying one or more specialists within an entity database of specialists that match specialization further comprises identifying one or more secondary specialists that are partial matches to the one or more requirements, based on matching the specialization of the one or more secondary specialists to the one or more requirements of the user and matching the location of the one or more secondary specialists to at least one of the current location of the user, one or more potential future locations of the user and the location of one or more primary specialists.

In some embodiments, determining availability of the user for appointment calendaring further comprises accessing a mobile device associated with the user and a calendaring application associated with the same to identify the availability of the user for appointment calendaring.

In some embodiments, the invention further comprises identifying the locations of the one or more appointments; determining availability of the one or more office spaces at the identified locations, based on at least the times and dates of the one or more appointments; reserving, automatically, the one or more office spaces at the identified location, based on determining the availability of the one or more office spaces; and transmitting the details of the reserved one or more office spaces to the one or more specialists and the user.

In some embodiments, the invention further comprises transmitting details of the one or more appointments to a mobile device associated with the user; receiving one or more confirmations associated with the one or more appointments from the user, wherein the at least one of the one or more confirmations is an audio confirmation; analyzing the tone and content of the audio confirmation; and comparing the audio confirmation with previously received audio confirmations from the user to determine if the user plans to retain the one or more appointments.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
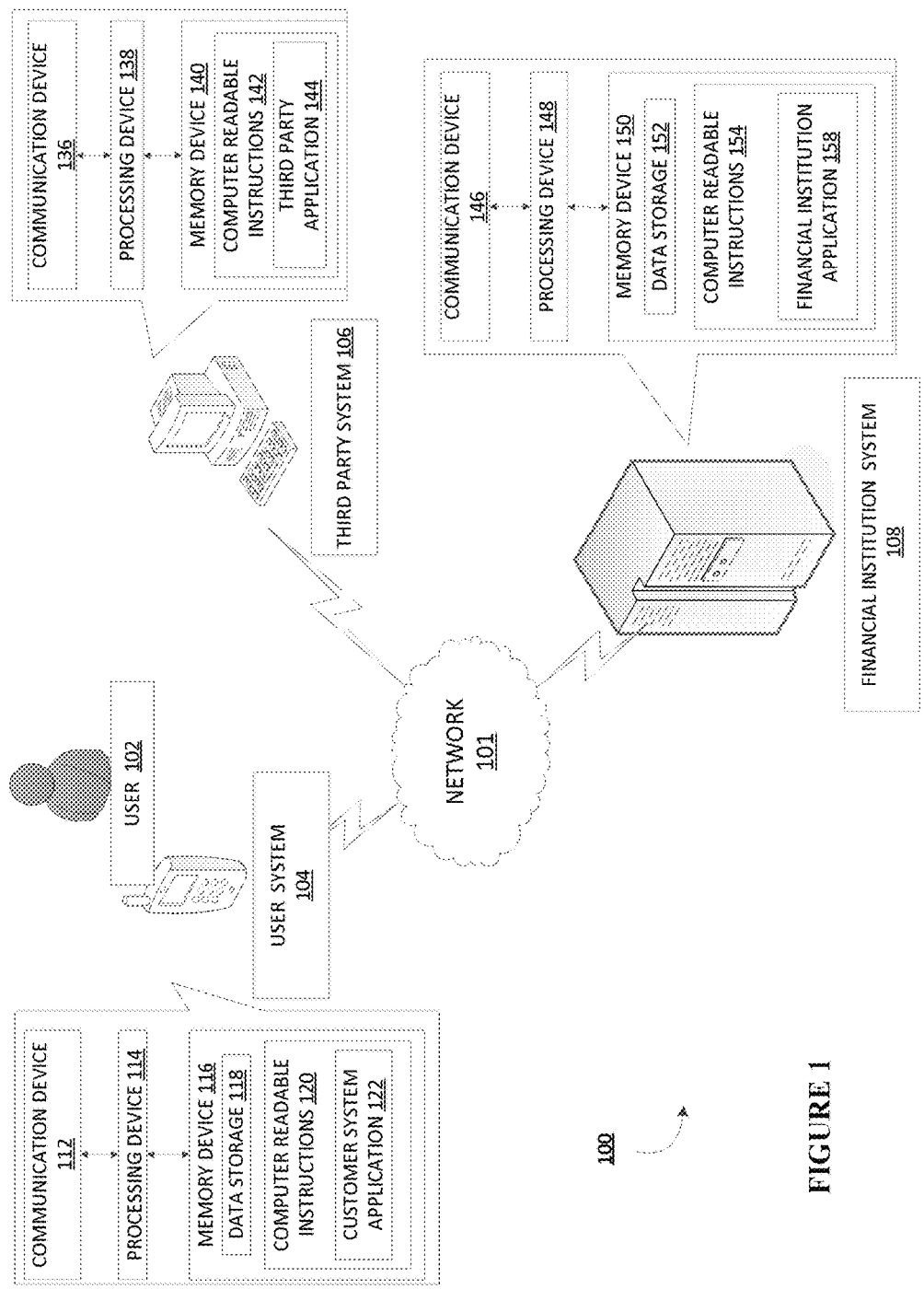
Figure 2:
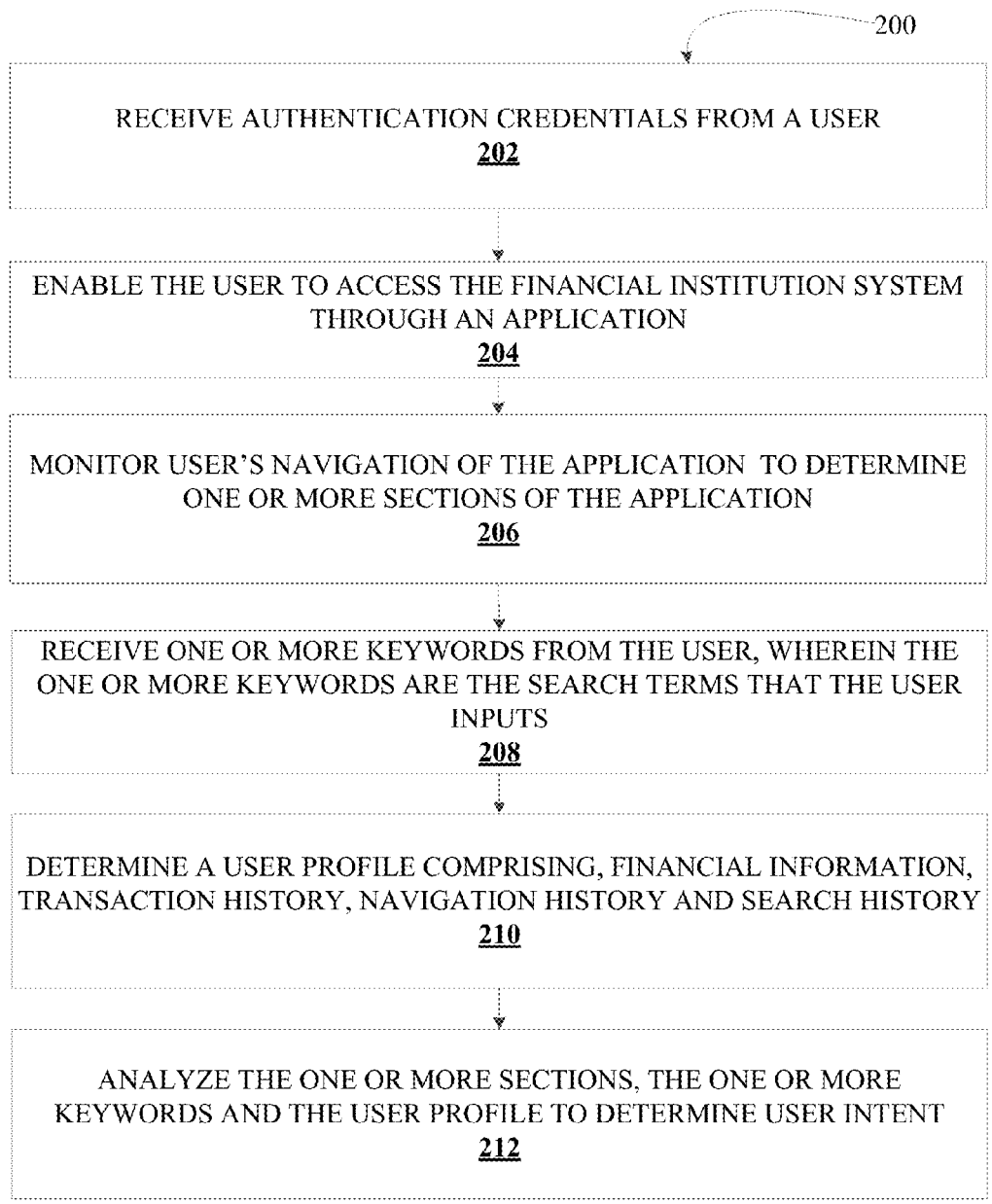
Figure 3:
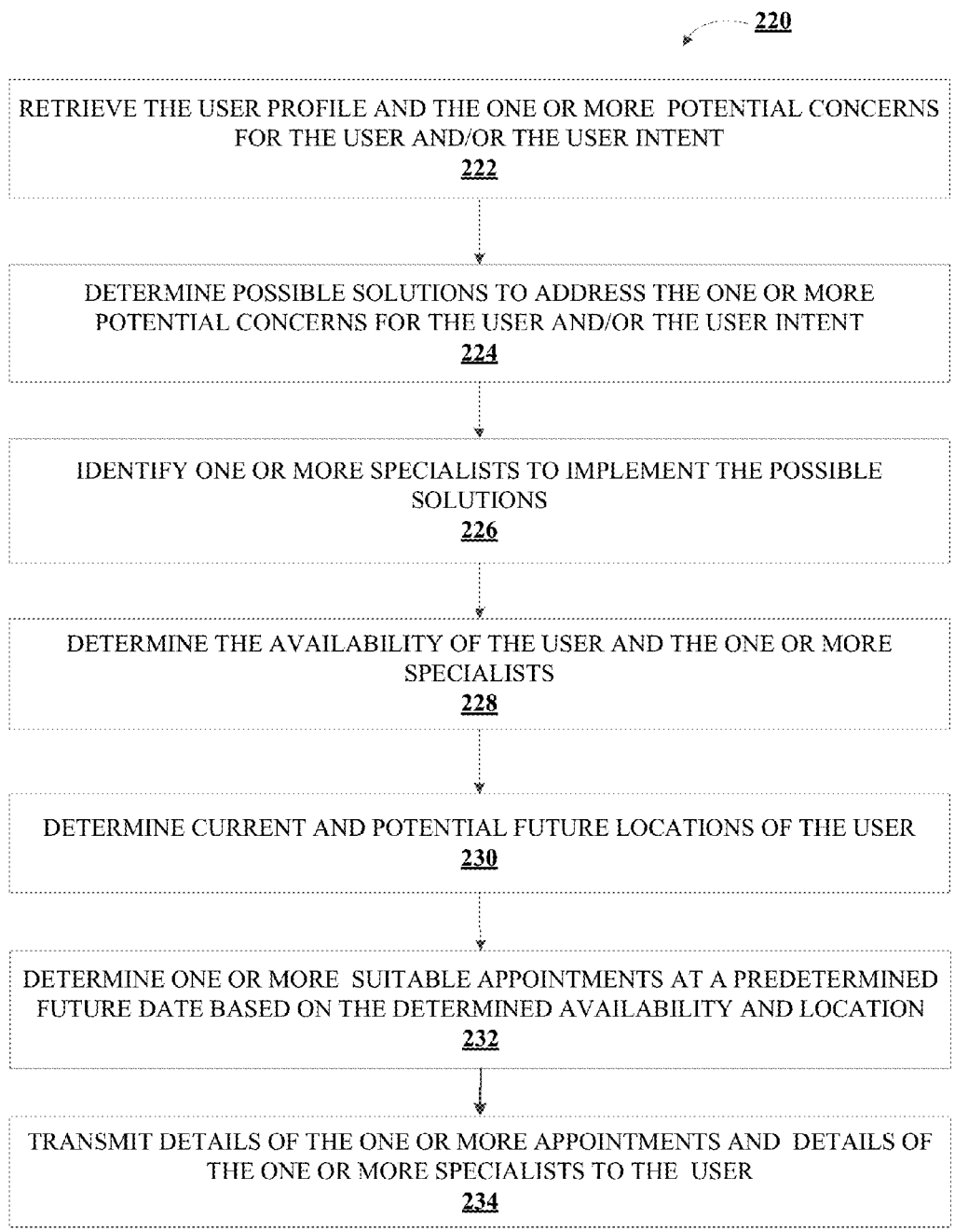
Figure 4:
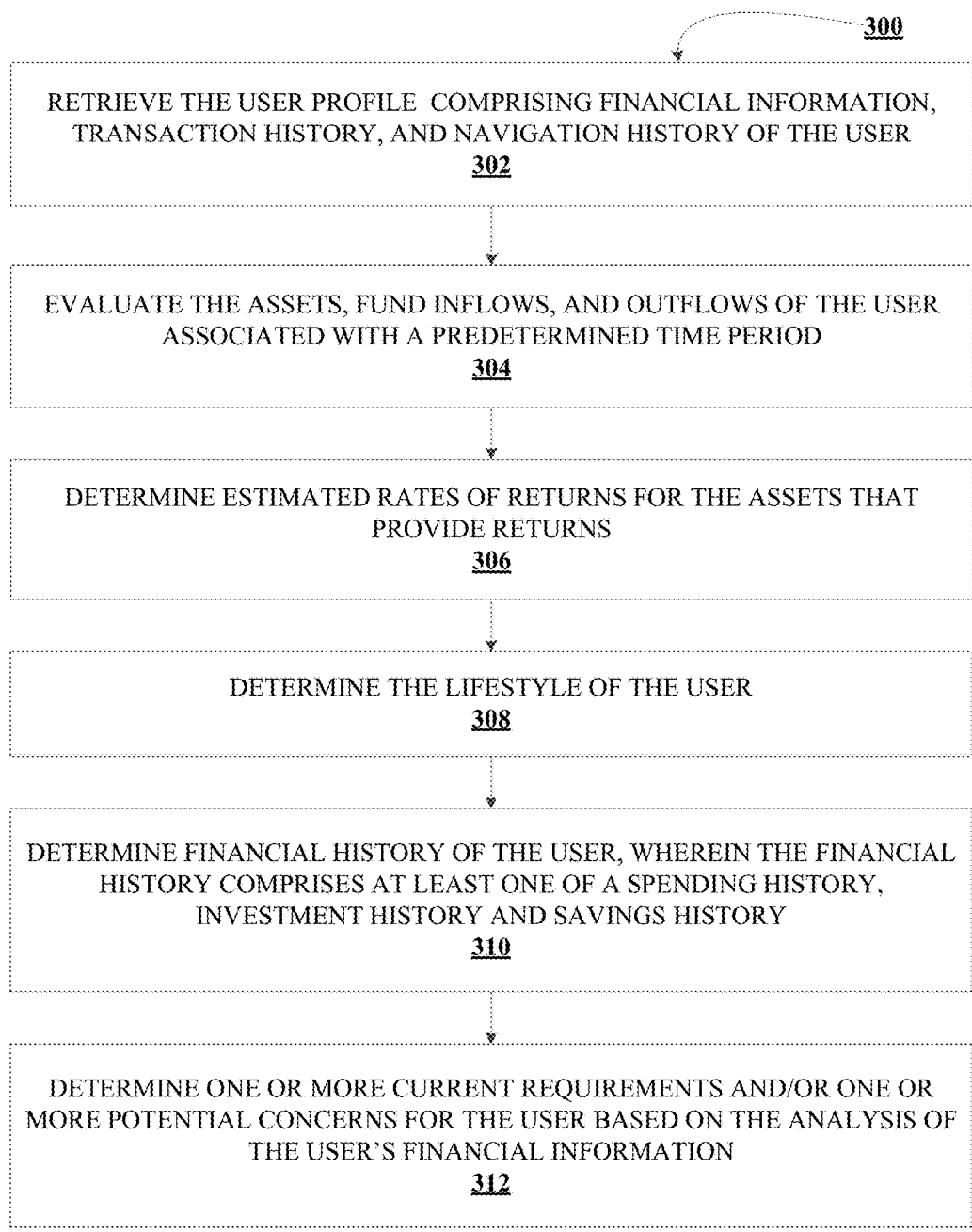
Figure 5:
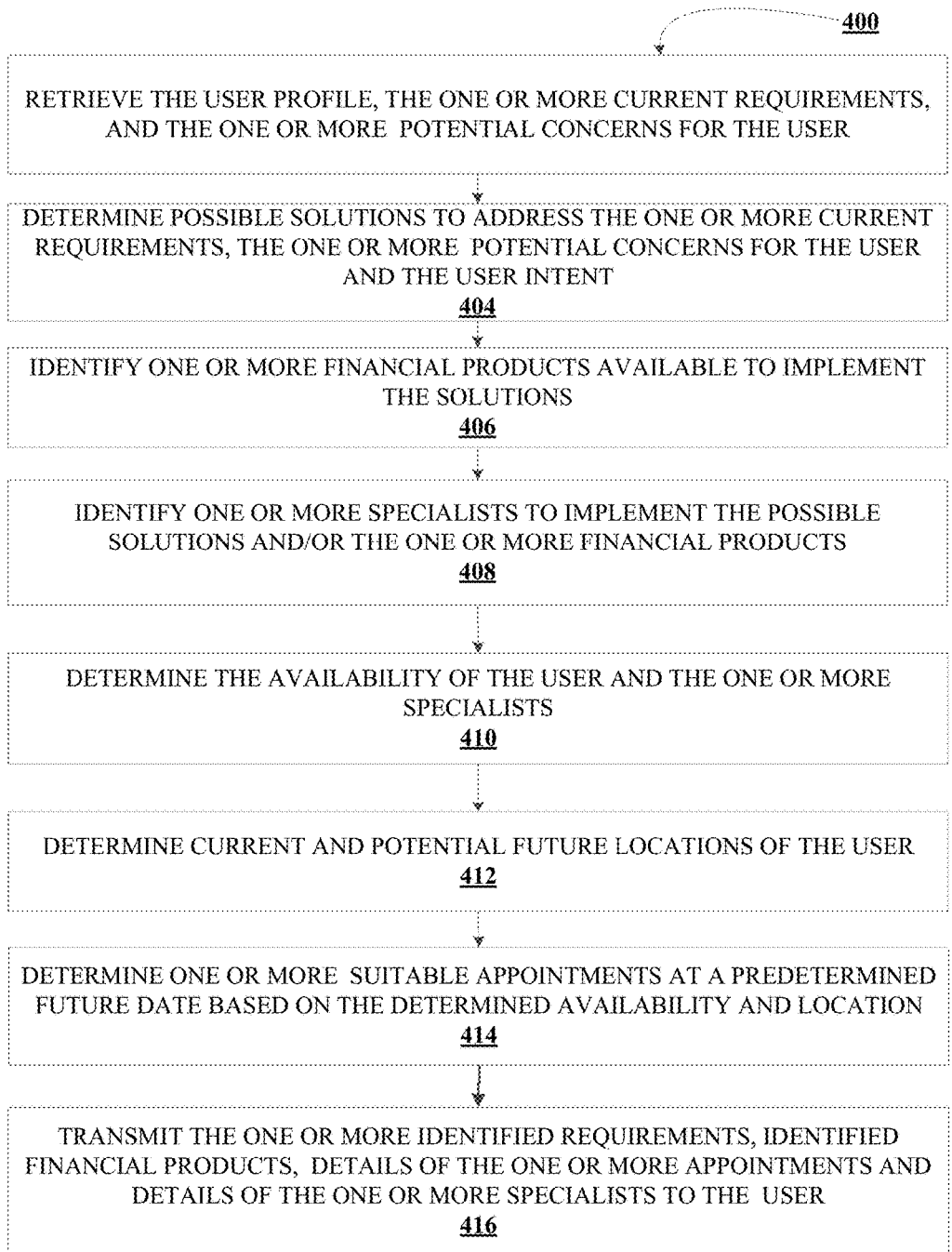
Figure 6:
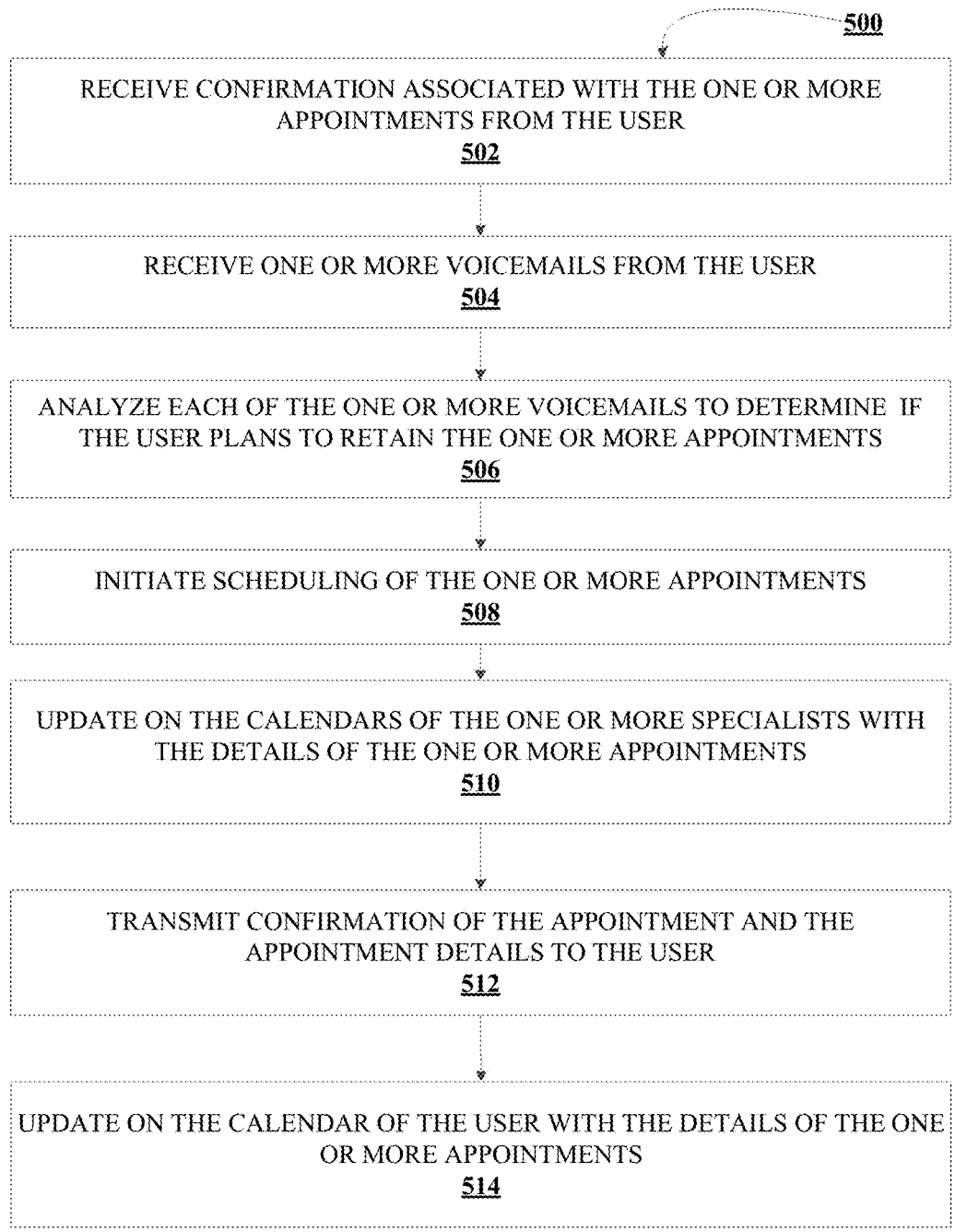
Figure 7:
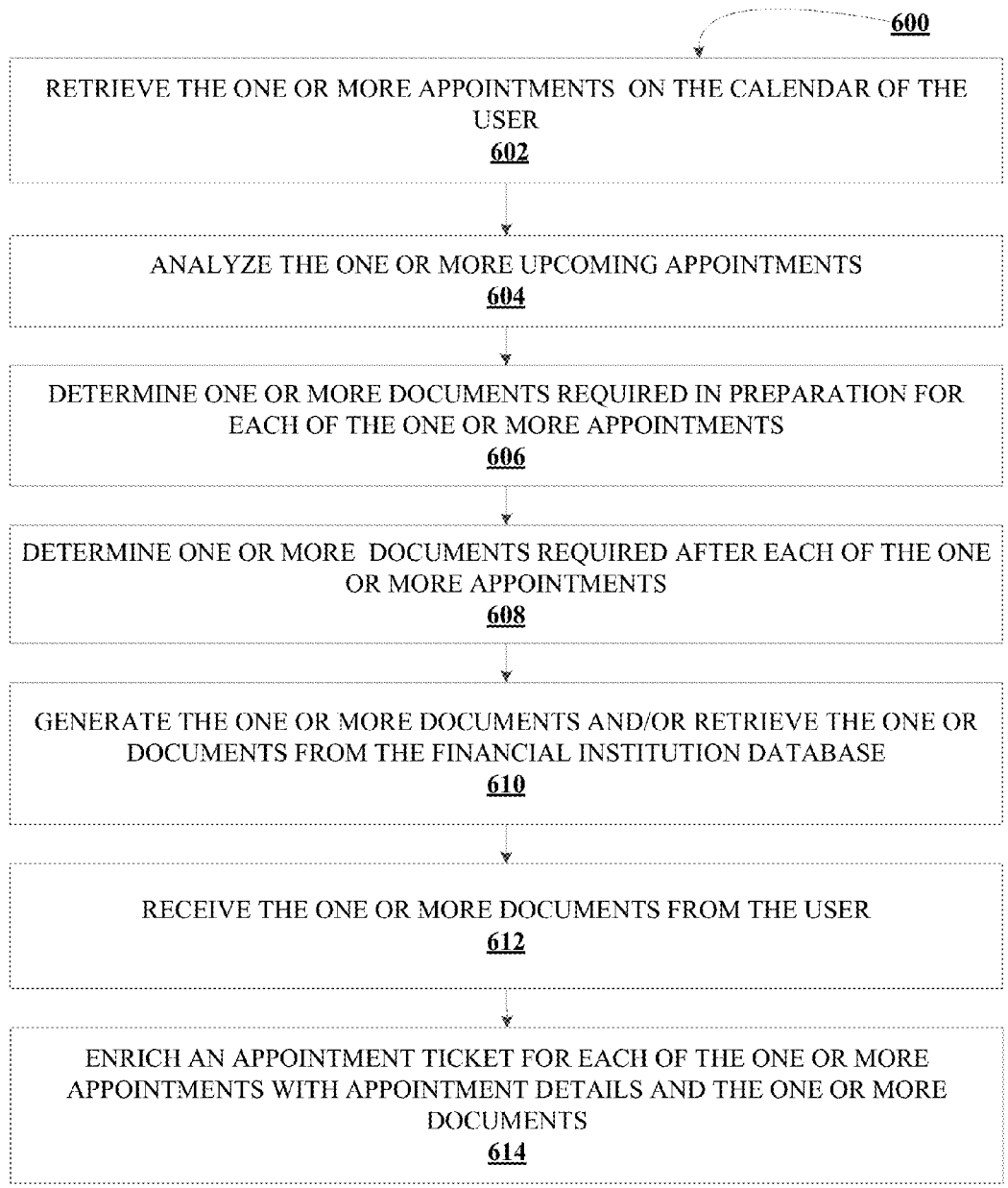
Figure 8:
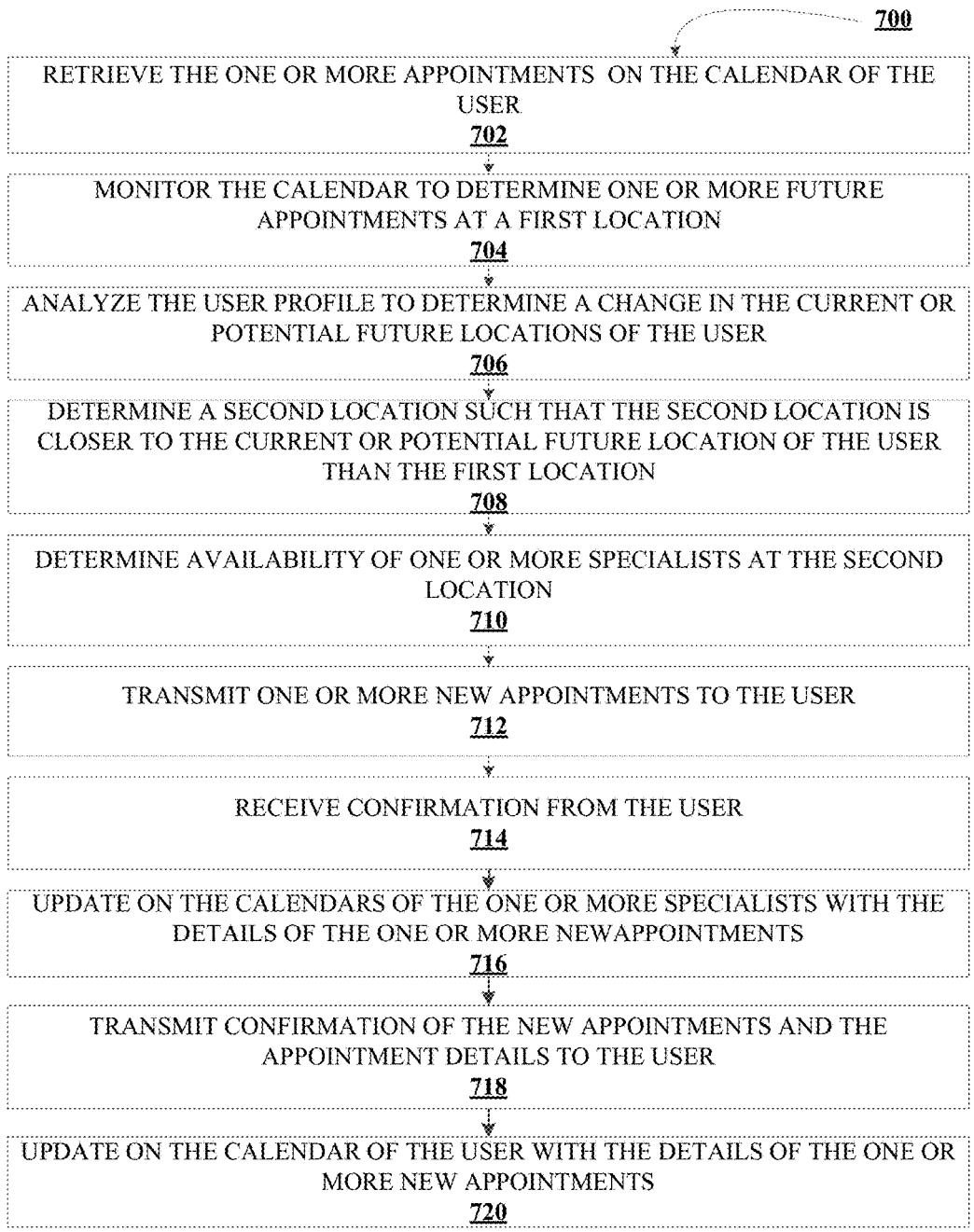
Figure 9:
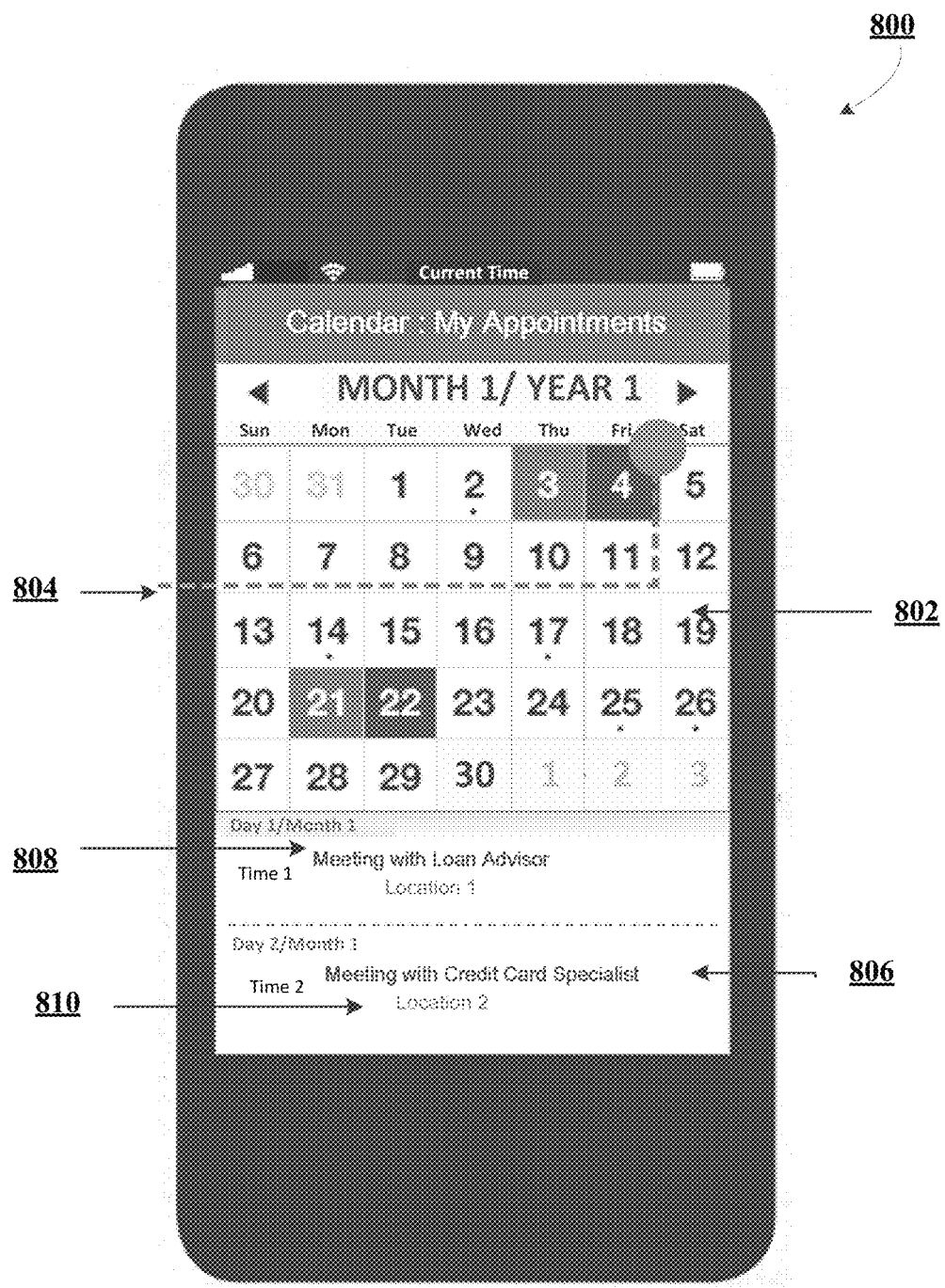

Having thus described embodiments of the invention in general terms, reference will now be made to the accompanying drawings, wherein:

FIG. 1 provides a an appointment calendaring system environment, in accordance with embodiments of the present invention;

FIG. 2 provides a high level process flow illustrating a process for affecting appointment calendaring based on navigation context, in accordance with some embodiments of the present invention;

FIG. 3 provides a high level process flow for determining one or more solutions, in accordance with some embodiments of the present invention;

FIG. 4 provides a high level process flow illustrating a process for facilitating appointment calendaring based on perceived requirements, in accordance with some embodiments of the present invention;

FIG. 5 provides a high level process flow for determining one or more solutions, in accordance with some embodiments of the present invention;

FIG. 6 provides a high level process flow for facilitating appointment calendaring, in accordance with some embodiments of the present invention;

FIG. 7 provides a high level process flow for illustrating a process for pre and post appointment enrichment, in accordance with some embodiments of the present invention;

FIG. 8 provides a high level process flow for illustrating a process for affecting appointment calendaring based on dependencies, in accordance with some embodiments of the present invention; and FIG. 9 provides an appointment calendaring user interface, in accordance with some embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions.

Some portions of this disclosure are written in terms of a financial institution's unique position with respect to user transactions. As such, a financial institution may be able to utilize its unique position to monitor and identify transactions for products or with merchants that utilize financial institution accounts to complete the transactions.

The embodiments described herein may refer to the initiation and completion of a transaction. Unless specifically limited by the context, a "transaction", "transaction event" or "point of transaction event" refers to any user completing or initiating a purchase for a product, service, or the like. The embodiments described herein may refer to an "advertisement." The embodiments described herein relate to solving a problem of appointment calendaring for a customer. If the customer has one or more requirements or issues, the customer may not know how to find solutions quickly and effectively. The present invention solves these problems automatically and in real time, by determining customer requirements and identifying suitable specialists. Therefore, the present invention in addition to solving current problems of the customer also helps the customer preclude future issues that the customer might not even be aware of and helps improve the customer's finances. The present invention communicates with multiple systems and performs specialized functions to facilitate appointment calendaring both before and after the scheduling of the appointment.

FIG. 1 illustrates an appointment calendaring system environment 100, in accordance with one embodiment of the present invention. As illustrated in FIG. 1, the financial institution system 108 is operatively coupled, via a network 101 to the user system 104, and to the third party system 106. In this way, the financial institution system 108 can send information to and receive information from the user system 104 and the third party system 106 to provide appointment calendaring for one or more users. FIG. 1 illustrates only one example of an embodiment of the appointment calendaring system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual associated with the financial institution. In some embodiments, the user 102 may access the financial institution system 108 through an interface comprising a webpage or a user application. Hereinafter, "user application" is used to refer to an application on the user system 104 of a user, a widget, a webpage accessed through a browser, and the like. In some embodiments the user application is a user system application 122 stored on the user system 104. In some embodiments the user application may refer to a third party application or a user application stored on a cloud used to access the financial institution system through a network. In some embodiments the user application is stored on the memory device 150 of the financial institution system. The user 102 may subsequently navigate through the interface, perform one or more searches or conduct one or more transactions using a user system 104. In some embodiments, a purchase may be made by the user 102 using the user system 104. In some embodiments, the user 102 may be a merchant or a person, employee, agent, associate, independent contractor, and the like that has an account or business with a financial institution or another financial institution that may provide payment to complete a transaction.

FIG. 1 also illustrates the user system 104. The user system 104 generally comprises a communication device 112, a processing device 114, and a memory device 116. The user system 104 is a computing system that allows a user 102 to interact with the financial institution to set up payment or transaction accounts to complete transactions for products and/or services. The processing device 114 is operatively coupled to the communication device 112 and the memory device 116. The processing device 114 uses the communication device 112 to communicate with the network 101 and other devices on the network 101, such as, but not limited to the third party system 106 and the financial institution system 108. As such, the communication device 112 generally comprises a modem, server, or other device for communicating with other devices on the network 101. In some embodiments the network 101 comprises a network of distributed servers.

The user system 104 comprises computer-readable instructions 120 and data storage 118 stored in the memory device 116, which in one embodiment includes the computer-readable instructions 120 of the user system application 122. In this way, a user 102 may open a financial institution account, remotely communicate with the financial institution, authorize a transaction, and/or complete a transaction using the user's user system 104. The user system 104 may be, for example, a desktop personal computer, a mobile system, such as a cellular phone, smart phone, personal data assistant (PDA), laptop, or the like. Although only a single user system 104 is depicted in FIG. 1, the system environment 100 may contain numerous user systems 104.

As further illustrated in FIG. 1, the financial institution system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the third party system 106 and the user system 104. As such, the communication device 146 generally comprises a modem, server, or other device for communicating with other devices on the network 101.

As further illustrated in FIG. 1, the financial institution system 108 comprises computer-readable instructions 154 stored in the memory device 150, which in one embodiment includes the computer-readable instructions 154 of a financial institution application 158. In some embodiments, the memory device 150 includes data storage 152 for storing data related to advertisement impressions and user transaction correlation, but not limited to data created and/or used by the financial institution application 158.

In the embodiment illustrated in FIG. 1 and described throughout much of this specification, the financial institution application 158 may receive an indication that a user 102 accessed the financial institution system 108 through the user application. In some embodiments the financial institution application 158 may receive an indication that a user 102 accessed the user application of another entity through operative communication with the third party system 106 via the network 101. In some embodiments the financial institution application 158, accessing the user data stored in the data storage 152, may receive authentication credentials from a user 102 and enable the user 102 to access the financial institution system through the user application by communicating with the user system 104. The financial institution application is further configured to monitor the user's navigation through the user application to determine one or more sections or pages of the application, accessed by the user 102. In this regard the financial institution application 158, in conjunction with the database or data storage 152 may identify multiple dates and times and associated duration in which the user 102 accessed a particular section or page of the application. In some embodiments the financial institution application 158 enables the user 102 to perform one or more searches by receiving search terms as input. In some embodiments the financial institution application 158 determines a user profile, preferably stored in the memory device 150 to maintain data security, comprising the user's demographic information, financial information, transaction history and navigation history to analyze the one or more sections and the user profile to determine user intent.

In some embodiments the financial institution application 158 analyzes the user profile comprising the user's information, financial information, transaction history, and navigation history. The user profile is preferably retrieved form a database or data storage 152 of the financial institution system 108 or a data storage system separate from the financial institution system. In some embodiments, in conjunction with the third party system 106, the financial institution application 158 may receive information about merchants and products associated with the navigation history to further determine user intent. The financial institution application 158 then determines the financial preparedness of the user 102 by assessing the assets and the liabilities, fund inflows and outflows, and estimated rates of returns for the assets that provide returns. The financial institution application 158 then determines the lifestyle of the user 102. In some embodiments the financial institution application 158 determines the financial history of the user 102 comprising at least one of a spending history, investment history, and savings history. Finally, the financial institution application 158 determines one or more current problems and/or one or more potential concerns for the user 102 based on the analysis of the user's financial information.

In some embodiments the financial institution application 158 determines possible solutions to address the one or more current requirements, the one or more potential concerns for the user 102 and the user intent. The financial institution application 158 then determines one or more financial products available to implement the solutions by sending requests and receiving information from the third party system 106 and the database or data storage 152 of the financial institution system 108. The financial institution application 158 may transmit the identified financial products to the user system 104 through the communication device 146 via the network 101. In some embodiments, in conjunction with the third party system 106, the financial institution application 158 may identify one or more specialists, advisors and associates to help the user implement the identified solutions and/or the one or more financial products. Further the financial institution application 158 may establish operative connections with the user system 104 and the third party system 106 to determine the availability of the user 102 and the one or more specialists. The financial institution application 158 may then access a location device such as GPS or AR on the user system 105 and determine current and potential future locations of the user 102 to determine one or more suitable appointments fort the user 102 at a predetermined future date. In addition the financial institution application 158 may transmit the identified appointments to the user system 104 through the communication device 146 via the network 101. The transmitting of identified appointments may be through an email, a phone call, an electronic message, in writing or any other suitable communication.

In some embodiments the financial institution application 158 receives one or more voicemails from the user communication device 112 through the network 101. The financial institution application 158 may then analyze the content and tone of the one or more voicemails to determine if the user 102 plans to retain the one or more appointments. The financial institution application 158 then communicates with the processing device 138 of the third party system to update the calendars of the one or more specialists with the details of the one or more appointments. In this regard the third part system 106 may comprise multiple systems associated with individual specialists in operative communication with the financial institution system 108. In some embodiments the financial institution application 158 then communicates with the processing device 114 of the user system 104 to transmit a confirmation of the appointment and to update the calendar of the user 102 with the details of the one or more appointments.

In some embodiments, in conjunction with the user system 104, the financial institution application 158 analyzes one or more upcoming appointments of the user 102. The financial institution application 158 may then determine one or more documents required in preparation and after the completion of each of the one or more appointments. The financial institution application 158 may then access the data storage 152 to retrieve one or more documents. In some embodiments generates the one or more required documents. In this regard the financial institution application 158 may communicate with the user system 104 to receive one or more documents uploaded by the user 102 or transmit one or more generated documents to the user system 104 to enable the user 102 to modify or add data using the user system application 122. In some embodiments the financial institution application 158 creates an appointment ticket comprising appointment details and the one or more documents, for each of the one or more appointments. Further, the financial institution application 158 may upload one or more appointment tickets on the user system 104 and the third party system 106 via the network 101.

In some embodiments, the financial institution application 158 in conjunction with the user system 104, continuously and in real time monitors the one or more appointments on the calendar of the user 102. The financial institution application 158 may then determine one or more future appointments at a first location. Further the financial institution application 158 may determine a change in the current of potential future locations of the user or one or more appointments at locations close to another location. The financial institution application 158 communicates with the third party system 106 to determine a second location such that the second location is closer to the current or potential location of the user 102 than the first location. The system then determines the availability of one or more specialists at the second location and transmits one or more new appointments to the user system 104. After receiving confirmation from the user through the user system 104, the financial institution application 158 updates the calendars of the user 102 and the one or more specialists at the second location with the details of the new appointments by communicating with the processing device 138 of the third party system 106 and the processing device 114 of the user system 104. In addition the financial institution application 158 may remove one or more appointments from the calendars of one or more specialists at the first location. In some embodiments, the financial institution application 158 then communicates with the processing device 114 of the user system 104 to transmit a confirmation of the new appointments.

FIG. 2 provides a high level process flow illustrating a process 200 for affecting appointment calendaring based on navigation context, in accordance with some embodiments of the present invention. As illustrated in block 202 the system requests authentication credentials from the user and determines access permissions of the user. For example, in one embodiment, the user may input as a preference that he/she would like username/password authentication and thus, the system would guide the user through a username/password setup and subsequently present a username/password prompt before the user or any other person can access the user application. In one embodiment, the user may provide as a preference and/or setting of the user application access to one or more second users. In such an embodiment, the user and/or the second users may set up a separate authentication for accessing the contents of the user application with different access permissions indicating varying levels of abstraction. The system then enables the user to access a portion or all sections on the application based on the determined access permissions at block 204. The various sections of the application can comprise sections for one or more user accounts, credit card section, loan section, products section, general information section, transfers section, services section and the like. The sections can comprise one or more subsections, for instance the loan section can comprise auto loans, education loans, housing loans and the like. In some embodiments enabling access comprises generating a customized application by populating the various sections of the user application with data associated with or relevant to the user or one or more second users linked to the user.

As represented by block 206, the system then monitors the user's navigation across the application and determines one or more sections that the user visited. The system then determines the duration for which the user visited each of the one or more sections the system may then correlate the current visit with previous visit dates, times and durations. In some embodiments, the system identifies the sections viewed or potentially viewed by the user. The viewed sections may be identified based on identification of factors, including, but not limited to the user selecting or clicking on a section, the user scrolling over the section, a determined duration the user for which viewed the section or the like. In this regard the financial institution system identifies multiple dates and times and associated duration in which the user accessed a particular section or page of the application over a predetermined time period to generate navigation maps and to identify patterns. The system then enables the user to perform one or more searches to assist the user in locating relevant sections at block 208. The system accepts one or more keywords, phrases, voice commands or the like as inputs to perform the searches.

In addition, as represented by block 210, the system determines a user profile comprising at least the user's demographic information, financial information, transaction history and navigation history. The demographic information comprises the user's age, geographic location, identification numbers and the like. The financial information comprises account details, income, credit history, retirement plans, savings accounts, tax statements, payments, investments and the like. The navigation history includes the dates, times and durations of visits to one or more sections logged in memory by the system, determined navigation maps and patterns, search criteria and search terms used and the like. Subsequently, the system analyzes the navigation history of the user profile to determine user intent at block 212. In some embodiments user intent comprises the tasks the user wishes to accomplish by using the user application or one or more products or information the user is looking for. The user intent may be one or more concerns or problems faced by the user, for which the user is seeks a solution through the user application. For example, if the user visits the loan section, the system analyzes the navigation history to and recognizes that the user is looking for specific information regarding auto loans. As another example if the user visits the card replacement section the system may determine that the user has misplaced his/her credit card. Also, the system may analyze the user profile to determine other details, for instance if the user has a credit or debit card. The process flow 200 is preferably performed by the system automatically, and in real time.

FIG. 3 provides a high level process flow 220 for determining one or more solutions, in accordance with some embodiments of the present invention. At block 222, the system retrieves all or a portion of the determined data associated with the user comprising the user profile, which may include the current potential concerns for the user and/or the user intent. As illustrated at block 224 the system then determined possible solutions to address the one or more potential concerns for the user and/or the user intent. For example the system may analyze the user intent and the identified patterns to determine that the user utilizes the user application to transfer a fixed amount every month to pay one or more bills. As another example, the system may determine that the user in the process of filling out a form suddenly stopped the process, either due to a problem in the application, the server or any other issue. The system may then arrange for a technical support specialist to call/assist the user with minimum response time. Another example to further illustrate the invention, the system may determine that the user has only partially completed a savings account form. The system may determine that the user needs assistance or more information regarding the form. The system may then determine that a savings account specialist will be able to assist the user.

Next, as illustrated by block 226, the system may identify one or more specialists, advisors or associates to help the user with the user's potential concerns or user intents. In some embodiments the system retrieves employee data from the financial institution database or the databases of other entities. The system then evaluates the retrieved data to determine a primary list of suitable specialists. For instance if the user has misplaced a credit card, the system may determine a primary list of credit card specialists and another secondary list of misappropriation prevention specialists. For another example, if the user requires a new car, the system determines a primary list of auto loan specialists and a secondary list of insurance specialists. In some embodiments the system utilizes predetermined broad criteria to limit the number of specialists on the primary list. The broad criteria can comprise location of the specialist, working hours, availability on weekends, availability over the phone and the like. In some embodiments the system receives the broad criteria from the user. In the instances where the system determines one or more secondary lists along with the primary list, the broad criteria can comprise conditions that a specialist on the secondary list must be located close to a specialist on the primary list or that the specialist on the secondary list must be available for appointments over the phone. The primary and secondary lists can comprise multiple sections with information associated with each of the one or more specialists comprising name, office location, practice area and the like.

As illustrated by block 228, the system then determines the availability of the one or more specialists on the primary and secondary lists. In this regard the system may access the calendars of the one or more specialists to determine available appointments. The system determines the available appointments based on individual time frames in the future for each of the one or more solutions. For instance, if the solution relates to diversifying investment options and that it does not adversely affect the user currently, the system may seek appointments within the next one to three weeks. As another example, if the system determines that the solution relates to replacing a lost credit card, the system may seek appointments in the immediate future, for example within the next two days. Further, in some embodiments, the system enables the user to customize the time frames. The system may also determine availability on the basis of required duration of an appointment. The system then modifies and/or narrows the primary and secondary lists based on the determined availability. In some embodiments, the system transmits the identified products and solutions to the user to seek confirmation before proceeding with the subsequent steps.

As illustrated by block 230, the system determines current and potential future locations of the user and compares these with the locations of the one or more specialists. The system may retrieve the home and office addresses of the user and seek specialists with office locations within a predetermined radius. In another embodiment of the invention, the system accesses the calendar on the user device to determine potential future locations of the user. For instance if the system determines that the user will travel elsewhere on a particular day and a particular time, the system then looks for specialists at the new location with appointments available at the appropriate time.

Next, as illustrated in block 232, the system determines one or more suitable appointments at a predetermined future date based on the determined availability and location. This determination is preferably based on the preceding steps in the process 220. In this regard the system may determine a series of suitable appointments. For example, if the user requires savings plans for retirement, the system may determine a first appointment with a specialist to discuss the user's goals, perceived requirements; identified solutions and each of the one or more identified financial products. The system may then set up second and third appointments to complete the implementation of one or more shortlisted products from the first appointment. In some embodiments, the system determines suitable appointments with multiple specialists on the primary and secondary lists. For example, if the user is applying for a loan, the system may set up a first appointment with a loan specialist to discuss loan parameters and rates, a second appointment a few days later to receive information for loan application, a third appointment with an insurance specialist and so on until the user's requirements have been attended to. In some embodiments the system determines one or more specialists for a single appointment, based on the determination that the user would require a meeting with multiple specialists.

Furthermore, on determining one or more suitable appointments, in some embodiments, the system may utilize optimization routines to identify the best one or more appointments for the user. For instance if the system had determined ten sets of appointments that meet the broad criteria, the system would then choose and/or modify one or two sets based on a refined criteria, wherein each set comprises one or more specialists, associated appointment times and locations. The refined criteria can comprise shortest distance for the user to travel, shortest time frame for a series of appointments, specialists who have assisted the user before, lowest cumulative cost and the like.

Finally, as illustrated in block 234, the system transmits the determined suitable one or more appointments to the user. In some embodiments the transmission is in the form of automatically pushing calendar invites to the user device. In some embodiments the transmission is a phone call, a message, an update or an alert on the user application or widget, an email or the like. In some embodiments the transmission includes details associated with the appointment including but not limited to the perceived requirements, determined solutions, one or more identified financial products, appointment location, appointment times and details associated with the one or more specialists. In some embodiments the invite or message containing activation links such that the user can indicate acceptance of the invitation for appointment. In some embodiments the system enables the user to decline one or more appointments and propose new times and/or locations. In this regard the system may repeat the previous steps to determine suitable appointments at the proposed times and/or locations. In some embodiments the system transmits more than one set of suitable appointments and enables the user to choose a preferable set. In some embodiments the transmission is initiating an automatic phone call to the user from a specialist instantaneously. For instance the system may transmit the identified products and the user details to a specialist and automatically initiate a call.

Furthermore, the system may push a transmitted detail of the one or more appointments to a user mobile device, such as via a calendar invite or the like. Furthermore, the system may access one or more systems associated with an office space, kiosk, or the like to hold the meeting and schedule a room or meeting place with that location.

FIG. 4 provides a high level process flow illustrating a process for facilitating appointment calendaring based on perceived requirements 300, in accordance with some embodiments of the present invention. As illustrated by block 302, the system retrieves the user profile comprising the user's demographic information, financial information, transaction history, navigation history and the like. In some embodiments the user profile also comprises social media information of a user. In this regard the system monitors various social media accounts of the user to determine user requirements and updates the user profile automatically and in real time.

As illustrated by block 304, embodiments of the invention comprise evaluating the assets and liabilities of the user wherein the assets and liabilities are a part of the financial information in the user profile, wherein the assets include illiquid assets and liquid assets. The user's assets may include but are not limited to checking accounts, savings accounts, investment accounts (e.g., with regular disbursements and penalties for principal withdrawals, or self-directed accounts that more liquid without penalties), annuity accounts (e.g., social security, claim awards, reverse mortgages, or the like), insurances benefit accounts (e.g., one time or reoccurring), property owned by the user (e.g., investment property, rental property, or the like), or other like assets that may provide regular or semi-regular recurring payments, assets that are or are similar to cash accounts, or assets that need to be sold in order to realize cash values of the assets. In some embodiments the assets may be illiquid (e.g., have penalties or may take time to convert into cash) or may be liquid (e.g., can be converted to cash in a couple of days without penalty). In one aspect, the process flow 300 includes determining a user's asset values (e.g., balances of the account, current or estimated future fair market values of the property, or the like) and liability values (e.g., amount owed, or the like). In some embodiments all of the assets and liabilities are determined in order to get an idea of what the values of the assets and liabilities are in order to determine how long the inflows and outflows for the user may last. In some embodiments the system seeks additional information from the user before completing the evaluation.

Furthermore, at block 304, embodiments of the invention further include determining fund in-flows and fund out-flows for the assets and liabilities over a past time period by analyzing transactions for the assets and the liabilities. In one aspect, the fund in-flows include funds received from or deposited into the user's assets (e.g., user's accounts, or the like), such as paychecks, 401K disbursements, pension disbursements, or the like. Block 304 further illustrates that past outflows of funds from the user's assets (e.g., user's accounts, or the like) are determined, such as payments for housing, bills, health care insurance and other costs, heat, water, food, or like. In some embodiments the process flow 300 is carried out by analyzing all of the user's financial information. In some embodiments only data associated with a predetermined time period is evaluated. In some embodiments the process flow 300 is performed by the system automatically, and in real time by maintaining a centralized repository of all user information. In this instance the system may seek input from the user regarding additional data required for analysis, time period for evaluation or focus areas for evaluation. Therefore the system enables the user to customize the user profile and the process flow 300.

As illustrated by block 306, embodiments of the invention further include determining estimated rates of return for the assets that provide returns. In some embodiments, the assets may include estimated rates of returns such that not only are the disbursements used in determining the retirement score, but the principal and growth of the principal over time may be used in determining the retirement score. At block 308 the system determines the lifestyle of the user. In some embodiments, the system may be configured to establish predefined user profiles including, but not limited to travel profiles, spending habits, lifestyle, or the like. For example, for the thrifty saver lifestyle the user may indicate that he/she may downsize the user's home in retirement, sell a vacation home, reduce travel expenses, or the like. The profiles may be pre-programed by the financial institution and/or programmable by the user to illustrate how the user currently lives or plans on living. Other lifestyles illustrate if the user will spend less, the same, or more in the future.

At block 310, embodiments of the invention further include determining financial history of the user, wherein the financial history comprises at least one of a spending history, investment history, and savings history. In one aspect, determining financial history of the user may include determining a spending pattern, investment pattern, and savings pattern of the user over a predetermined past period of time. In one aspect, determining the financial history of the user is based on at least the user profile. In this regard, the system may be configured to generate one or more predetermined questions to enable the user to provide additional information regarding the user's financial history to the system. In one aspect, the personality, values, opinions, attitudes, interests, lifestyles, or the like of the user may be determined by the system or received as answers to predetermined questions from the user.

As illustrated by block 312 the system then determines one or more current requirements and/or one or more potential concerns for the user based on the analysis of the user profile. As described above, the system analyzes the financial information, demographic information, transaction history, and navigation history of the user. The system then determines one or more current requirements of the user. For instance the system may determine that the user would benefit from refinancing an existing loan. In some embodiments the system also determines potential future concerns. In some embodiments the system transmits the identified requirements of the user and seeks confirmation form the user before proceeding to the next steps. In some embodiments the system enables the user to modify identified requirements and/or specify new financial goals and new requirements.

FIG. 5 provides a high level process flow 400 for determining one or more solutions, in accordance with some embodiments of the present invention. At block 402, the system retrieves all or a portion of the determined data associated with the user comprising the user profile, the one or more current requirements, and the one or more potential concerns for the user. As illustrated at block 404 the system then determined possible solutions to address the one or more current requirements, and the one or more potential concerns for the user. For example the system may analyze the user and the identified patterns to determine that the user utilizes the user application to transfer a fixed amount every month to pay one or more bills. The system may then determine setting up automatic transfers as a solution for this user intent. As another example, based on analysis of the user profile the system may determine that the user has relocated recently and may require renter's insurance. The system may determine that the user would benefit from linking accounts of the user and the user's spouse. As another example the system may determine that the user requires a savings plan for retirement at a future date. The system may then calculate the amount required to be saved on a monthly basis to meet goals and determine that a combination of a savings account and a certificate of deposit as a solution. As another example, the user may post that he/she has bought a new car on social media. The system may then determine that the user would require auto insurance.

Subsequently, at block 406, the system then identifies one or more financial products available to implement the solutions. For example the system may access databases of various entities to determine financial products available and further determine the user's eligibility for the financial products. The financial products can be offered by the financial institution, other banks, insurance companies and the like. The financial products may be products that the user qualifies based on analysis of the user profile. As, illustrated by block 408, the system then identifies one or more specialists, advisors or associates to help the user implement the identified solutions and/or the one or more financial products. In some embodiments the system retrieves employee data from the financial institution database or the databases of other entities. The system then evaluates the retrieved data to determine a primary list of suitable specialists. For instance if the user has misplaced a credit card, the system may determine a primary list of credit card specialists and another secondary list of fraud and theft prevention specialists. For instance if the user requires a new car, the system determines a primary list of auto loan specialists and a secondary list of insurance specialists. In some embodiments the system utilizes predetermined broad criteria to limit the number of specialists on the primary list. The broad criteria can comprise location of the specialist, working hours, availability on weekends, availability over the phone and the like. In some embodiments the system receives the broad criteria from the user. In the instances where the system determines one or more secondary lists along with the primary list, the broad criteria can comprise conditions that a specialist on the secondary list must be located close to a specialist on the primary list or that the specialist on the secondary list must be available for appointments over the phone. The primary and secondary lists can comprise multiple sections with information associated with each of the one or more specialists comprising name, office location, practice area and the like. In some embodiments the system matches each of the specialists on the secondary list to at least one specialist on the primary list based on location, specialization and the like. In this regard a specialist on the primary list and the primary list and the associated specialists on the secondary list are treated as an entity, for example if the system eliminates one or more specialists from the primary list based on predetermined criteria, the associated specialists on the secondary list are automatically removed.

As illustrated by block 410, the system then determines the availability of the one or more specialists on the primary and secondary lists. In this regard the system may access and analyze the calendars of the one or more specialists to determine prior appointments, available times and the like. In this regard, the system communicates with multiple devices to determine availability. Furthermore, the system communicates with one or more devices of the user which comprise the user's calendars, for example a mobile device, home computer, work computer and the like to determine the availability of the user. The calendars referred to above can comprise a calendar application on the user device, the user application, social media accounts, various other applications or any other suitable means to determine prior appointments and availability. The system determines the available appointments based on individual time frames in the future for each of the one or more solutions. For instance, if the solution relates to diversifying investment options and that it does not adversely affect the user currently, the system may seek appointments within the next one to three weeks. As another example, if the system determines that the solution relates to replacing a lost credit card, the system may seek appointments in the immediate future, for example within the next day. Further, in some embodiments the system enables the user to customize the time frames. The system may also determine availability on the basis of required duration of an appointment for example, an hour long appointment, two hours and the like. The system then modifies and/or narrows the primary and secondary lists based on the determined availability. In some embodiments the system transmits the identified products and solutions to the user to seek confirmation before proceeding with the subsequent steps.

As illustrated by block 412, the system determines current and potential future locations of the user and compares these with the locations of the one or more specialists. The system may retrieve the home and office addresses of the user and seek specialists with office locations within a predetermined radius. In another embodiment of the invention, the system accesses the calendar on the user device to determine potential future locations of the user. For instance if the system determines that the user will travel elsewhere on a particular day and a particular time, the system then looks for specialists at the new location with appointments available at the appropriate time. At block 414, the system determines one or more suitable appointments at a predetermined future date based on the determined availability and location. This determination is preferably based on the preceding steps in the process flow 400. In this regard the system may determine a series of suitable appointments. For example, if the user requires savings plans for retirement, the system may determine a first appointment with a specialist to discuss the user's goals, perceived requirements; identified solutions and each of the one or more identified financial products. The system may then set up second and third appointments to complete the implementation of one or more shortlisted products from the first appointment. In some embodiments the system determines suitable appointments with multiple specialists on the primary and secondary lists. For example, if the user is applying for a loan, the system may set up a first appointment with a loan specialist to discuss loan parameters and rates, a second appointment a few days later to receive information for loan application, a third appointment with an insurance specialist and so on until the user's requirements have been attended to. In some embodiments the system determines one or more specialists for a single appointment, based on the determination that the user would require a meeting with multiple specialists.

Furthermore, on determining one or more suitable appointments, in some embodiments, the system may utilize optimization routines to identify the best one or more appointments for the user. For instance if the system had determined ten sets of appointments that meet the broad criteria, the system would then choose and/or modify one or two sets based on a refined criteria, wherein each set comprises one or more specialists, associated appointment times and locations. The refined criteria can comprise shortest distance for the user to travel, shortest time frame for a series of appointments, specialists who have assisted the user before, lowest cumulative cost and the like. At block 416 the system transmits the determined suitable one or more appointments to the user. In some embodiments the transmission is in the form of automatically pushing calendar invites to the user device. In some embodiments the transmission is a phone call, a message, an update or an alert on the user application or widget, an email or the like. In some embodiments the transmission includes details associated with the appointment including but not limited to the perceived requirements, determined solutions, one or more identified financial products, appointment location, appointment times and details associated with the one or more specialists. In some embodiments the invite or message containing activation links such that the user can indicate acceptance of the invitation for appointment. In some embodiments the system enables the user to decline one or more appointments and propose new times and/or locations. In this regard the system may repeat the previous steps to determine suitable appointments at the proposed times and/or locations. In some embodiments the system transmits more than one set of suitable appointments and enables the user to choose a preferable set. In some embodiments the transmission is initiating an automatic phone call to the user from a specialist instantaneously. For instance the system may transmit the identified products and the user details to a specialist and automatically initiate a call.

FIG. 6 provides a high level process flow 500 for facilitating appointment calendaring, in accordance with some embodiments of the present invention. At block 502, the system receives confirmation from the user associated with one or more transmitted appointment. The confirmation can be the user activating a link on the transmitted invite or message, a response in the form of a message or email from the user. In some embodiments the system enables the user to indicate whether the user is accepting the appointment tentatively or declining the appointment or accepting it with a degree of certainty. In some embodiments, as indicated by block 504 the confirmation is in the form of an audio message, wherein the system enables the user to record a voice mail or a message in response to the transmitted appointments. In some embodiments the user application user interface comprises an intelligent personal assistant and knowledge navigator such that the communication between the user and the application is audio-visual. In this instance the system may receive multiple voice commands for the user and the system may determine one or more of them to be a confirmation. As illustrated by block 506, the system then analyzes the one or more voice messages or audio confirmations to determine if the user plans to retail the one or more appointments. In this regard the system evaluates the tone and content of the message to make the determination. The system may compare the received message to previously received messages from the user, a database with standardized voice samples and the like.

As illustrated by block 508, the system initiates the setup of the one or more appointments for which the system received confirmations from the user. Initiating the setup further comprises determining available office spaces for the appointments. For instance the system reviews a particular appointment at a first location and evaluates the offices, kiosks, rooms or the like for availability. The system then automatically reserves the available spaces for the appropriate appointment time slots. The system may determine that an appointment requires the user to have a discussion with multiple specialists and the system may then reserve a room that can accommodate the required number of people. As another example the system may determine that the appointment requires the user to perform a setup online, make a payment or that the appointment requires the user to sign some documents. Accordingly the system may reserve a room that has the required technical support such as computers, monitors, printers, card readers and the like.

Subsequently, as illustrated by block 510, the system updates the calendars of the one or more specialists with the details of the one or more appointments. The system updates the calendars automatically with the user information, perceived requirements, identified solutions and products, reserved rooms and the like. Preferably the system also transmits messages with links or calendar updates with links to enable the specialist to access at least a portion of the user profile either in preparation or during the appointment. The system then automatically transmits a confirmation of the scheduled one or more appointments to the user as illustrated by block 512. The confirmation can include details of the appointment, location and reserved room details, one or more forms to be filled out in preparation for the appointment, links to the one or more forms, information or brochures associated with the one or more identified financial products and the like. At block 514, the system accesses the user device and updates the user calendar with the appointment details at the appropriate time and day. In some embodiments the system updates the calendars on multiple devices. In some embodiments the system automatically creates one or more reminders at appropriate days and times preceding the appointment. In some embodiments the system enables the user to customize the one or more appointments, for instance provide additional/different goals, topics, issues, solutions and the like to be discussed with the specialist. If the system determines that these new proposed goals are different from the area of expertise of the associated specialist, the system may seek additional appointments with specialists who are more suited to the new proposed goals.

FIG. 7 provides a high level process flow 600 for illustrating a process for pre and post appointment enrichment, in accordance with some embodiments of the present invention. In some embodiments process flow 600 is performed by system after the completion of the previous processes. In some embodiments the system carries out the various process flows and steps in parallel to save computing time. As illustrated by block 602, the system retrieves the one or more appointments on the calendar of the user. In this regard the system may continuously and in real time monitor the appointments on the user's calendar. At block 604, the system analyzes the one or more upcoming appointments. In this regard the system may prioritize the one or more retrieved appointments based on various factors like relevance to financial planning, how soon the appointment is scheduled to occur, importance to the user, time required for pre-appointment enrichment and the like. At block 606, the system then analyzes the retrieved appointments to ascertain the appointment details, requirements of the user and the like. In this regard the system may access the user profile and financial data of the user and create an appointment ticket for each of the one or more appointments. As illustrated by block 608, the system determines one or more documents required in preparation for each of the one or more appointments. The documents can comprise identity proofs, address proofs, tax documents, insurance documents, various forms to be completed by the user, and/or the financial institution and the like.

As illustrated by block 608, the system determines one or more documents required after the completion of each of the one or more documents. In some embodiments these documents are similar to the pre-appointment documents. In some embodiments the post appointment documents include documents that require data generated during the appointment, documents for the next appointment, follow-up forms, survey forms and the like. Next at block 610, the system generates the one or more documents, in electronic, physical, tangible or any other suitable form. In some embodiments the system examines the user profile to determine if any of the documents already exist. In that case the system automatically retrieves the documents and uploads them onto the appropriate appointment tickets. In some embodiments the system generates the one or more required documents for pre- and/or post-appointment enrichment, for example the system may create one or more forms for the user to complete. In this regard the system may populate the forms with available information and seek additional information from the user. In some embodiments the system enables the user to validate the one or more pre- and post-appointment documents. At block 612, the system sends requests to the user and enables the user to upload one or more documents. The system enables the user to upload the documents by utilizing the user application, by email, by fax or any other suitable means. In some embodiments the system enables the user to utilize a camera on a phone or another device to capture the document. At block 614, the system populates the appointment ticket with documents from the preceding steps. In some embodiments the system also enriches the appointment ticket with confirmations, order codes, work order codes, authorization credentials and that like that could be provided to the specialist as the specialist aids the user. In some embodiments the appointment tickets are configured as search and retrievable data. In some embodiments the system transmits the enriched appointment tickets to the one or more specialists and uploads the appointment tickets on their calendars.

FIG. 8 provides a high level process flow 700 for illustrating a process for affecting dynamic appointment calendaring based on time/location dependency. Preferably, the system carries out the process flow 700 automatically and in real time. As illustrated by block 702, the system retrieves one or more appointments on the calendar of the user. Preferably, the system continuously monitors the calendars of the user on one or more devices. In some embodiments the system determines a change in existing appointments or cancellation of an appointment or engagement such that the user is newly available at a certain time, reflecting the time dependency. The system then evaluates one or more upcoming existing appointments with the financial institution and ascertains the appointment details. The system determines if the specialist associated with the existing appointment is available at the time slot of the cancelled engagement and proposes a new appointment. If the specialist associated with the existing appointment is not available, the system retrieves the primary and secondary lists to determine one or more new specialists at the same or different locations. The system then analyzes their availability and proposes new appointments. In this regard the system determines whether the cancelled engagement occurs before the existing appointment and only then proposes a new appointment. In some embodiments the system may determine the availability of other specialists from the primary and secondary lists. In this regard the system may conduct one or more steps from the previously described process flows. Further, the system may employ suitable criteria to determine if a new appointment is feasible. For instance the system would determine that a new appointment with a secondary specialist is not feasible if the appointment with the primary specialist has not occurred. For instance if the determined new specialist has the same specialization required for the existing appointment the system determined that an appointment with the new specialist is feasible.

At block 704, the system monitors the calendar to determine one or more future appointments at a first location. For example the system may determine that the user has an appointment with a loan specialist at location a first location. As illustrated at block 706, the system continuously analyses the user profile to determine a change in current or potential future locations of the user, reflecting the location dependency. In some embodiments, the steps concerning location dependency are substantially similar to that of the time dependency described above. Continuing the previous example, the system may analyze the user profile and/or the user calendar to determine a new engagement which requires to user to travel to a location B, at a particular date and time, wherein location B is the new potential future location. In some embodiments the system determines the current location of the user. For example the system may monitor GPS, AR technology, WiFi connectivity of the user device or analyze, in real time, the social media updates of the user to recognize that the user at a location B, wherein location B is the user's new current location. At block 708 the system determines a second location such that the second location is closer to the new current or potential future locations of the user than the first location. The system retrieves the locations or the branches of the financial institution from a database and compares the locations to the new current or potential locations of the user. For example the system may calculate the distance between each of the retrieved second locations and the location B to determine a second location of the financial institution closest to location B. In some embodiments the system determines multiple second locations close to location B. In this regard the system may evaluate each of the determined locations with respect to both previously determined locations of the user and new locations of the user, based on various optimization methods. Preferably the system employs optimization methods comprising travelling salesman problem, linear programming, combinational optimization, minimum spanning tree or any other suitable method to determine the optimal second location. In some embodiments the system may determine the user's presence near a financial institution instantaneously by determining that the user is within the WiFi range of financial institution location. In this instance the new location B and the second location are determined to be concurrent.

At block 710, the system determines the availability of one or more specialists at the second location with the required specialization. On determining an optimal second location, the system may determine the availability of specialists at the second location during an estimated duration that the user will be available at the second location. For instance the system may determine that the user' engagement at location B is between 1:00 PM and 2:00 PM and analyze the user profile to determine that the user is most likely to travel by car. Further the system may estimate that the travel time between location B and the optimal second location, based on determining the probable mode of transport, parking distance and traffic predictions is 15 minutes. Then the system may seek appointments between 11:30 AM and 12:40 PM or between 2:20 PM to 3:30 PM. In this regard the system may access the calendars of the appropriate specialists at the second location. Further, the system determines whether the available specialists at the second location have the required specialization to meet user requirement. For example, if the user requires a credit card specialist and the system determines that the credit card specialists at the optimal second location are not available at the appropriate time, the system may then analyze other retrieved locations of the financial institution to identify an available credit card specialist at another second location.

As illustrated by block 712, the system transmits the one or more new appointments to the user. On determining that one or more suitable specialists are available, the system generates one or more new appointments and transmits an alert, a message or a calendar invite to a user device. The message can comprise details of the previous appointment, the new proposed appointment, information associated with the appointment, specialists and the like. Preferably the system determines the optimal mode of transport comprising walking, driving, public transport and the like. For example the system may generate also generate a map indicating the travel from location B to the second location and include it in the message. The map could also include parking directions, location of the scheduled office spaces within the second location and the like. The message could also include one or more action buttons for the user to indicate that the user accepted or confirmed the new appointment, that the user declined the new appointment. As illustrated by block 714, the system receives a confirmation from the user. On receiving the confirmation from the user the system, at block 716, updates the calendars of the one or more specialists with the details of the one or more new appointments. The details of the appointment could be transferred by the system from the previous appointment comprising user details, appointment tickets and the like. Further the system may modify the calendars of the specialists associated with the previous appointment and the user calendar to reflect the cancellation. At block 718 the system transmits confirmation of the new appointments and the associated appointment details to the user. In addition, the system updates the calendar of the user with the details of the one or more appointments at block 720.

FIG. 9 provides an exemplary appointment calendaring user interface 800 in accordance with some embodiments of the invention. The interface 800 is illustrated as being displayed via the user's mobile device. However, the interface can be displayed on any device of the user system 104. In some embodiments the interface is displayed through the user application. In some embodiments the interface 800 is displayed through other applications on the user system 104. The interface 800 comprises a first panel 802. The first panel 802 represents the completed or upcoming appointments of the user arranged chronologically. The first panel 802 can comprise day, week, month or year view. In some embodiments the system determines the importance of the appointments and highlights the varying levels of importance with different visual features like color, shape and the like. In some embodiments the appointments with specialists from the primary list are highlighted differently from the appointments with specialists from the secondary list. The first panel also comprises a pointer 804 to enable the user to choose, modify, add or switch appointments. In some embodiments the 804 comprises a series of touch interactions or gestures by the user to accomplish a certain task. In some embodiments the pointer 804 responds to voice commands of the user to accomplish certain tasks.

The interface 800 comprises a second panel 806 displaying details of one or more appointments. The appointments can be arranged chronologically or in any other suitable order. The second panel 806 comprises appointment details including the appointment date, time, title of the appointment 808, location details 810 and the like. In some embodiments the title of the appointment 808 is a link. When the user chooses this link 808, the interface may initiate display of a third panel or window (not shown) where the user can view the details of the one or more upcoming appointments comprising the appointment ticket, pre- and post-appointment enriched documents, user's personal notes regarding the appointment and at least a part of the user profile. In some embodiments the system populates the details of determined appointments and one or more specialists from block 234 and 416 tentatively, and enables the user to view them and transmit confirmation through 808. On receiving confirmation, the system updates the first panel and the second panel with the final appointment details from blocks 514, 614 and 720. In some embodiments the link with the title of the appointment 808 enables the user to upload or modify one or more pre-appointment documents. In this regard the system may activate the camera on the user device to enable the user to capture the document. In some embodiments the link with the title of the appointment 808 is associated with previously completed appointments. In this regard the link enables the user to provide feedback, setup additional appointments, review the completed appointment, modify or upload one or more post appointment documents and the like.

In some embodiments the location details 810 comprises a link. In this regard, on activating the link the user may view one more maps associated with the location on a fourth panel or window (not shown). In some embodiments the system determines maps with routes from the current or potential future locations of the user to the first or second locations of the specialists. In some embodiments the system enables the user to modify the determined routes or the locations. In some embodiments the link with the location details 810 comprises maps and details of the routes to the reserved office spaces at the first or second location. In some embodiments the system automatically sets up one or more reminders for the upcoming appointments. In this regard the system may transmit the reminders through the interface 800, by phone, by email or any other suitable means. In some embodiments the system enables the user to modify the mode and frequency of the reminders.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, JAVA, PERL, SMALLTALK C++, SAS, SQL, PYTHON, OBJECTIVE C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for appointment calendaring based on perceived customer requirements for a user, the system comprising:
    a memory device with computer-readable program code stored thereon;
    a communication device;
    a processing device operatively coupled to the memory device and the communication device, wherein the processing device is configured to execute the computer-readable program code to:
        retrieve a user profile for the user, wherein the user profile contains financial information and transaction history of the user;
        determine in-flows and out-flows of the user associated with a predetermined time period;
        determine estimated rates of return for assets that provide returns;
        determine financial history of the user, wherein the financial history comprises at least one of a spending, investment, and savings history of the user;
        determine one or more requirements of the user, wherein determining one or more requirements is based at least on evaluating the user profile, determined asset values, in-flows, out-flows, and financial history, wherein the one or more requirements comprise current requirements and potential future requirements;
        access a user device associated with the user to determine user availability and one or more potential future locations of the user, wherein determining availability of the user for appointment calendaring further comprises accessing a mobile device associated with the user and a calendaring application associated with the mobile device associated with the user to identify the availability of the user for appointment calendaring;
        identify one or more specialists within an entity database of specialists located at the one or more potential future locations of the user, wherein identifying further comprises matching the one or more requirements to one or more specialists;
        extract availability data for the one or more identified specialists and availability data for the user via analyzing calendars of the one or more identified specialists and via accessing the user device and calendaring applications of the user;

schedule, based on the availability of the one or more identified specialists and the availability of the user, one or more appointments, wherein scheduling further comprises updating a calendaring application of the one or more specialists and the calendaring application of the user with the one or more appointments;

identify an appointment location of the one or more appointments;

determine availability of office spaces at the appointment location, based on times and dates of the one or more appointments;

reserve one of the office spaces at the appointment location based on determining the availability of the office spaces;

transmit details of the one or more appointments to a mobile device associated with the user;

receive an audio confirmation associated with the one or more appointments from the user;

analyze the tone and content of the audio confirmation, wherein analyzing the tone and content of the audio confirmation comprises:
  accessing a database of standardized voice samples for the user; and
  comparing the tone and content of the audio confirmation with previously received messages from the user;

based on the analyzed toned and content of the audio confirmation, determine if the user plans to retain the one or more appointments;

transmit the details of the reserved office spaces to the one or more specialists and the user; and display an appointment calendaring user interface through the calendaring application of the one or more specialists and the calendaring application of the user, wherein updates or modifications to an appointment are generated on the appointment calendaring user interface for the one or more specialists and the user and the updates or modifications include the details of the reserved one or more office spaces to the one or more specialists and the user.

2. The system of claim 1 further comprising creating the user profile for the user by storing financial information, transaction history, navigation history, and social media information associated with the user, wherein navigation history comprises one or more sections of an application viewed by the user based on the monitoring of the user navigation of the application in association with transaction history of the user.

3. The system of claim 1, wherein identifying one or more specialists within an entity database of specialists that match specialization further comprises:
  determining the location and specialization of each of the one or more identified specialists;
  identifying one or more primary specialists that are a perfect match to the one or more requirements, based on matching the specialization of the one or more primary specialists to the one or more requirements of the user and matching the location of the one or more primary specialists to the current location and/or one or more potential future locations of the user; and
  identifying one or more secondary specialists that are partial matches to the one or more requirements, based on matching the specialization of the one or more secondary specialists to the one or more requirements of the user and matching the location of the one or more secondary specialists to at least one of the current location of the user, one or more potential future locations of the user and the location of one or more primary specialists.

4. The system of claim 1, wherein identifying one or more specialists within an entity database of specialists further comprises:
  determining one or more solutions to meet the one or more requirements of the user;
  identifying one or more financial products associated with the one or more solutions; and
  identifying one or more specialists to implement the one or more solutions.

5. A computer program product for appointment calendaring based on perceived customer requirements for a user, the computer program product comprising at least one non-transitory computer-readable medium having computer-readable program code portions embodied therein, the computer-readable program code portions comprising:

an executable portion configured for retrieving a user profile for the user, wherein the user profile contains financial information and transaction history of the user;

an executable portion configured for determining fund in-flows and out-flows of the user associated with a predetermined time period;

an executable portion configured for determining estimated rates of return for assets that provide returns;

an executable portion configured for determining financial history of the user, wherein the financial history comprises at least one of a spending history, investment history and savings history;

an executable portion configured for determining one or more requirements of the user, wherein determining one or more requirements is based at on evaluating the user profile, determined asset values, in-flows, out-flows, and financial history, wherein the one or more requirements comprise current requirements and potential future requirements;

an executable portion configured for accessing a user device associated with the user to determine user availability and one or more potential future locations of the user, wherein determining availability of the user for appointment calendaring further comprises accessing a mobile device associated with the user and a calendaring application associated with the mobile device associated with the user to identify the availability of the user for appointment calendaring;

an executable portion configured for identifying one or more specialists within an entity database of specialists located at the one or more potential future locations of the user, wherein identifying further comprises matching the one or more requirements to one or more specialists;

an executable portion configured for extracting availability data for the one or more identified specialists and availability data for the user via analyzing calendars of the one or more identified specialists and via accessing the user device and calendaring applications of the user;

an executable portion configured for scheduling, based on the availability of the one or more identified specialists and the availability of the user, one or more appointments, wherein scheduling further comprises updating a calendaring application of the one or more specialists and the calendaring application of the user with the one or more appointments;

an executable portion configured for identifying an appointment location of the one or more appointments;

an executable portion configured for determining availability of office spaces at the appointment location, based on times and dates of the one or more appointments;

an executable portion configured for reserving one of the office spaces at the appointment location based on determining the availability of the office spaces;

an executable portion configured for transmitting details of the one or more appointments to a mobile device associated with the user;

an executable portion configured for receiving an audio confirmation associated with the one or more appointments from the user;

an executable portion configured for analyzing the tone and content of the audio confirmation, wherein analyzing the tone and content of the audio confirmation comprises;

accessing a database of standardized voice samples for the user; and comparing the tone and content of the audio confirmation with previously received messages from the user;

an executable portion configured for determining if the user plans to retain the one or more appointments based on the analyzed toned and content of the audio confirmation;

an executable portion configured for transmitting the details of the reserved office spaces to the one or more specialists and the user; and an executable portion configured for displaying an appointment calendaring user interface through the calendaring application of the one or more specialists and the calendaring application of the user, wherein updates or modifications to an appointment are generated on the appointment calendaring user interface for the one or more specialists and the user and the updates or modifications include the details of the reserved one or more office spaces to the one or more specialists and the user.

6. The computer program product of claim 5 further comprising creating the user profile for the user by storing financial information, transaction history, navigation history, and social media information, associated with the user, wherein navigation history comprises one or more sections of an application viewed by the user based on the monitoring of the user navigation of the application in association with transaction history of the user.

7. The computer program product of claim 5, wherein identifying one or more specialists within an entity database of specialists that match specialization further comprises:

determining the location and specialization of each of the one or more identified specialists;

identifying one or more primary specialists that are a perfect match to the one or more requirements, based on matching the specialization of the one or more primary specialists to the one or more requirements of the user and matching the location of the one or more primary specialists to the current location and/or one or more potential future locations of the user; and identifying one or more secondary specialists that are partial matches to the one or more requirements, based on matching the specialization of the one or more secondary specialists to the one or more requirements of the user and matching the location of the one or more secondary specialists to at least one of the current location of the user, one or more potential future locations of the user and the location of one or more primary specialists.

8. The computer program product of claim 5, wherein identifying one or more specialists within an entity database of specialists further comprises:

determining one or more solutions to meet the one or more requirements of the user;

identifying one or more financial products associated with the one or more solutions; and identifying one or more specialists to implement the one or more solutions.

9. A computer-implemented method for appointment calendaring based on perceived customer requirements of a user, the method comprising:

providing a computing system comprising at least one computer processing device and a non-transitory computer readable medium, where the computer readable medium comprises configured computer program instruction code, such that when said instruction code is operated by said at least one computer processing device, said at least one computer processing device performs the following operations:

retrieving a user profile for the user, wherein the user profile contains financial information and transaction history of the user;

determining in-flows and out-flows of the user associated with a predetermined time period;

determining estimated rates of return for assets that provide returns;

determining financial history of the user, wherein the financial history comprises at least one of a spending history, investment history, and savings history;

determining one or more requirements of the user, wherein determining one or more requirements is based at least on evaluating the user profile and determining asset values, in-flows, out-flows, and financial history, wherein the one or more requirements comprise current requirements and potential future requirements;

accessing a user device associated with the user to determine user availability and one or more potential future locations of the user, wherein determining availability of the user for appointment calendaring further comprises accessing a mobile device associated with the user and a calendaring application associated with the mobile device associated with the user to identify the availability of the user for appointment calendaring;

identifying one or more specialists within an entity database of specialists located at the one or more potential future locations of the user, wherein identifying further comprises matching the one or more requirements to one or more specialists;

extracting availability data for the one or more identified specialists and availability data for the user via analyzing calendars of the one or more identified specialists and via accessing the user device and calendaring applications of the user;

scheduling, based on the availability of the one or more identified specialists and the availability of the user, one or more appointments, wherein scheduling further comprises updating a calendaring application of the one or more specialists and the calendaring application of the user with the one or more appointments;

identifying an appointment location of the one or more appointments;

determining availability of office spaces at the appointment location, based on times and dates of the one or more appointments;

reserving one of the office spaces at the appointment location based on determining the availability of the office spaces;

transmitting details of the one or more appointments to a mobile device associated with the user;

receiving an audio confirmation associated with the one or more appointments from the user;

analyzing the tone and content of the audio confirmation, wherein analyzing the tone and content of the audio confirmation comprises:

accessing a database of standardized voice samples for the user; and comparing the tone and content of the audio confirmation with previously received messages from the user;

based on the analyzed toned and content of the audio confirmation, determining if the user plans to retain the one or more appointments;

transmitting the details of the reserved office spaces to the one or more specialists and the user; and displaying an appointment calendaring user interface through the calendaring application of the one or more specialists and the calendaring application of the user, wherein updates or modifications to an appointment are generated on the appointment calendaring user interface for the one or more specialists and the user and the updates or modifications include the details of the reserved one or more office spaces to the one or more specialists and the user.

10. The computer implemented method of claim 9 further comprising creating the user profile for the user by storing financial information, transaction history, navigation history, and social media information associated with the user, wherein navigation history comprises one or more sections of an application viewed by the user based on the monitoring of the user navigation of the application in association with transaction history of the user.

11. The computer implemented method of claim 9, wherein identifying one or more specialists within an entity database of specialists that match specialization further comprises:

determining the location and specialization of each of the one or more identified specialists;

identifying one or more primary specialists that are a perfect match to the one or more requirements, based on matching the specialization of the one or more primary specialists to the one or more requirements of the user and matching the location of the one or more primary specialists to the current location and/or one or more potential future locations of the user; and identifying one or more secondary specialists that are partial matches to the one or more requirements, based on matching the specialization of the one or more secondary specialists to the one or more requirements of the user and matching the location of the one or more secondary specialists to at least one of the current location of the user, one or more potential future locations of the user and the location of one or more primary specialists.

\* \* \* \* \*